United States Patent
Iizuka

(10) Patent No.: US 7,188,279 B2
(45) Date of Patent: *Mar. 6, 2007

(54) METHOD, PROGRAM, AND STORAGE MEDIUM FOR ACQUIRING LOGS

(75) Inventor: Toshiaki Iizuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

This patent is subject to a terminal disclaimer.

(21) Appl. No.: 10/465,280

(22) Filed: Jun. 20, 2003

(65) Prior Publication Data

US 2004/0003326 A1    Jan. 1, 2004

(30) Foreign Application Priority Data

Jun. 28, 2002    (JP) .............................. 2002-191127
Jun. 28, 2002    (JP) .............................. 2002-191130

(51) Int. Cl.
*G06F 11/00*    (2006.01)
(52) U.S. Cl. ..................... 714/38; 714/35; 717/127; 717/128
(58) Field of Classification Search ................. 714/35; 717/129, 130
See application file for complete search history.

(56) References Cited

U.S. PATENT DOCUMENTS

| | | | | |
|---|---|---|---|---|
| 5,903,758 A | * | 5/1999 | Walker | 717/130 |
| 5,946,486 A | * | 8/1999 | Pekowski | 717/128 |
| 5,970,245 A | * | 10/1999 | Poteat et al. | 717/128 |
| 6,161,216 A | * | 12/2000 | Shagam | 717/128 |
| 6,996,808 B1 | * | 2/2006 | Niewiadomski et al. | 717/130 |
| 7,107,579 B2 | * | 9/2006 | Tsai et al. | 717/127 |

* cited by examiner

*Primary Examiner*—Scott Baderman
*Assistant Examiner*—Joseph Schell
(74) *Attorney, Agent, or Firm*—Fitzpatrick, Cella, Harper & Scinto

(57) ABSTRACT

A log acquisition method is provided that allows a processing log of software to readily be acquired and reduces the man-hours needed for analyzing a bug. The log acquisition method is a method for acquiring a runtime log of a program 91 including a function (FuncAA), comprising the step of changing the address of the function (FuncAA) loaded to the address of a function (92) for log acquisition, wherein the function (92) for log acquisition comprises the steps of: calling the function (FuncAA) (96) to cause a predetermined process to be executed (97), receiving the result of the execution (98), and passing said result to said program 91 (101), recording given information when calling the address of the function (FuncAA) (95, 100), and recording given information when receiving the result of the execution (99, 100).

27 Claims, 43 Drawing Sheets

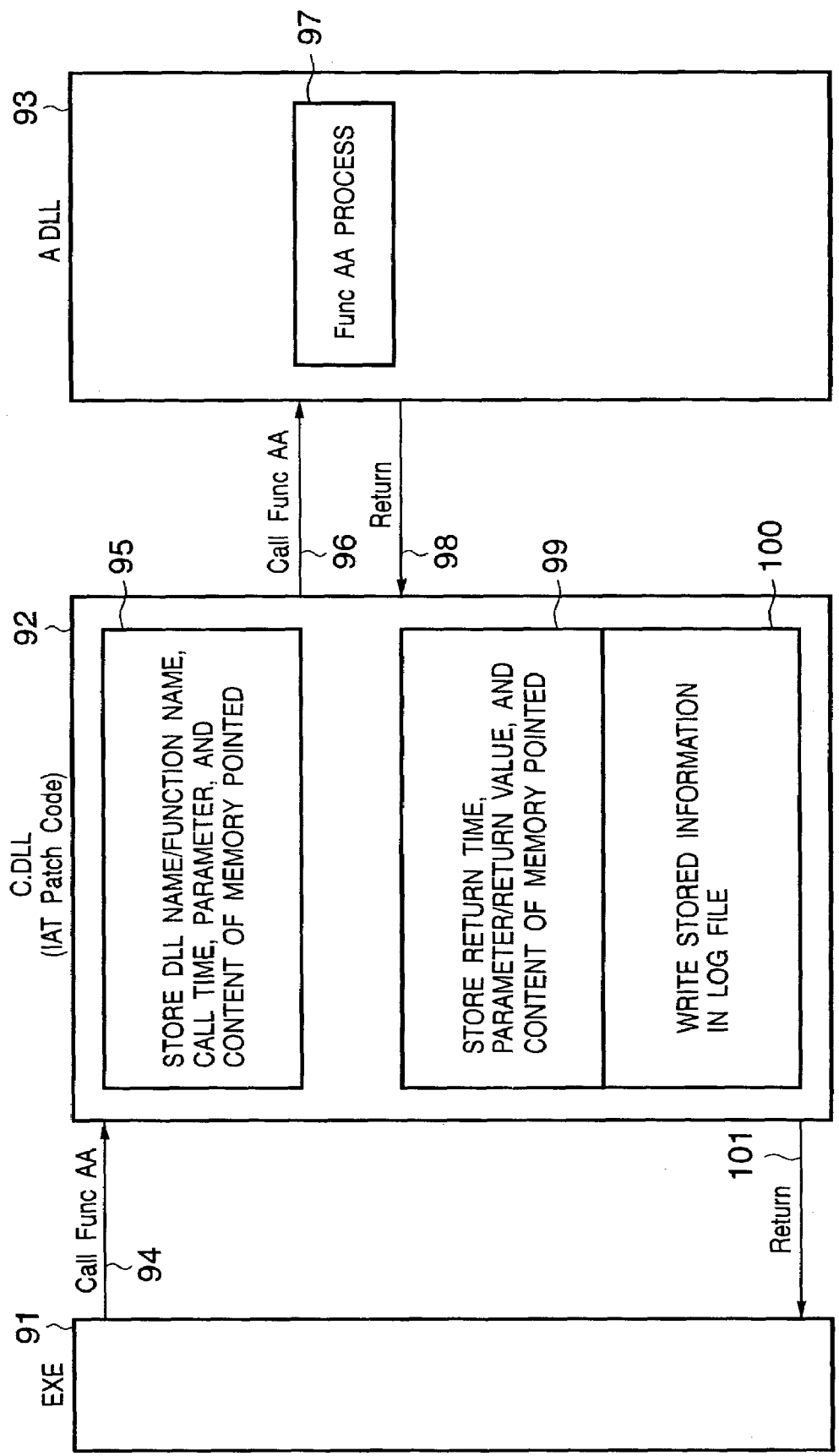

FIG. 10

INTERFACE NAME :    Interface A
METHOD NAME : Method AA
ARGUMENT :          DWORD dwID
RETURN VALUE :      DWORD dwRet INTERFACE NAME :    Interface A
METHOD NAME : Method AB
ARGUMENT :          DWORD dwSize
RETURN VALUE :      int nRet INTERFACE NAME :    Interface A
METHOD NAME : Method AC
ARGUMENT :          DWORD dwSize
RETURN VALUE :      DWORD dwRet INTERFACE NAME :    Interface B
METHOD NAME : Method BA
ARGUMENT :          DWORD dwSize
RETURN VALUE :      int nRet INTERFACE NAME :    Interface B
METHOD NAME : Method BC
ARGUMENT :          DWORD dwID
RETURN VALUE :      DWORD dwRet

FIG. 11

INTERFACE NAME :   Interface A
METHOD NAME : Method AA
ARGUMENT :         DWORD dwID : 256
RETURN VALUE :    DWORD dwRet : 0
IN TIME :            2002/03/25 22 : 24 : 12. 025
OUT TIME :          2002/03/25 22 : 24 : 12. 035

INTERFACE NAME :   Interface B
METHOD NAME : Method BA
ARGUMENT :         DWORD dwSize : 512
RETURN VALUE :    int nRet : −1
IN TIME :            2002/03/25 22 : 24 : 12. 046
OUT TIME :          2002/03/25 22 : 24 : 12. 057

INTERFACE NAME :   Interface B
METHOD NAME : Method BC
ARGUMENT :         DWORD dwID : 12
RETURN VALUE :    DWORD dwRet : 2
IN TIME :            2002/03/25 22 : 24 : 12. 068
OUT TIME :          2002/03/25 22 : 24 : 12. 079

```
INTERFACE NAME :   Interface A
METHOD NAME : Method AA
ARGUMENT :         DWORD dwID
RETURN VALUE :     DWORD dwRet INTERFACE NAME :   Interface A
METHOD NAME : Method AB
ARGUMENT :         DWORD dwSize
RETURN VALUE :     int nRet INTERFACE NAME :   Interface A
METHOD NAME : Method AC
ARGUMENT :         DWORD dwSize
RETURN VALUE :     DWORD dwRet INTERFACE NAME :   Interface B
METHOD NAME : Method BA
ARGUMENT :         DWORD dwSize
RETURN VALUE :     int nRet INTERFACE NAME :   Interface B
METHOD NAME : Method BC
ARGUMENT :         DWORD dwID
RETURN VALUE :     DWORD dwRet
```

FIG. 16

```
INTERFACE NAME :    Interface A
METHOD NAME : Method AA
ARGUMENT :          DWORD dwID : 256
RETURN VALUE :      DWORD dwRet : 0
IN TIME :           2002/03/25 22 : 24 : 12. 025
OUT TIME :          2002/03/25 22 : 24 : 12. 035

INTERFACE NAME :    Interface B
METHOD NAME : Method BA
ARGUMENT :          DWORD dwSize : 512
RETURN VALUE :      int nRet : −1
IN TIME :           2002/03/25 22 : 24 : 12. 046
OUT TIME :          2002/03/25 22 : 24 : 12. 057

INTERFACE NAME :    Interface B
METHOD NAME : Method BC
ARGUMENT :          DWORD dwID : 12
RETURN VALUE :      DWORD dwRet : 2
IN TIME :           2002/03/25 22 : 24 : 12. 068
OUT TIME :          2002/03/25 22 : 24 : 12. 079

INTERFACE NAME: Interface A
METHOD NAME: Method AA
ARGUMENT: DWORD dwID
RETURN VALUE: DWORD dwRet INTERFACE NAME: Interface A
METHOD NAME: Method AB
ARGUMENT: Interface B **ppInterface
RETURN VALUE: int nRet INTERFACE NAME: Interface A
METHOD NAME: Method AC
ARGUMENT: DWORD dwID
RETURN VALUE: Interface B *pInterface INTERFACE NAME: Interface B
METHOD NAME: Method BA
ARGUMENT: DWORD dwSize
RETURN VALUE: int nRet INTERFACE NAME: Interface B
METHOD NAME: Method BB
ARGUMENT: DWORD dwID
RETURN VALUE: DWORD dwRet

FIG. 19

INTERFACE NAME :    Interface A
METHOD NAME : Method AB
ARGUMENT :         Interface B **ppInterface : 0x7F234DC0
RETURN VALUE :   int nRet : 0
IN TIME :           2002/03/25 22 : 24 : 12. 025
OUT TIME :         2002/03/25 22 : 24 : 12. 035

INTERFACE NAME :    Interface B
METHOD NAME : Method AC
ARGUMENT :         DWORD dwID : 1
RETURN VALUE :   Interface B *pInterface : 0x5DC2E8DC0
IN TIME :           2002/03/25 22 : 24 : 12. 046
OUT TIME :         2002/03/25 22 : 24 : 12. 057

INTERFACE NAME :    Interface B
METHOD NAME : Method BA
ARGUMENT :         DWORD dwSize : 512
RETURN VALUE :   int nRet : −1
IN TIME :           2002/03/25 22 : 24 : 12. 068
OUT TIME :         2002/03/25 22 : 24 : 12. 079

PackingOpition :          8byte

DLL NAME :          A.DLL
FUNCTION NAME :     FuncAA
ARGUMENT :          DWORD dwID
RETURN VALUE :      DWORD dwRet DLL NAME :          A.DLL
FUNCTION NAME :     FuncAB
ARGUMENT :          structData{
                                                    char cIndex
                                                    short int nLength
                                                    long int nData
                                                    int64 n64Detail
                                                    }
RETURN VALUE :      int nRet DLL NAME :          B.DLL
FUNCTION NAME :     FuncBA
ARGUMENT :          DWORD dwID
RETURN VALUE :      DWORD dwRet DLL NAME :          B.DLL
FUNCTION NAME :     FuncBB
ARGUMENT :          DWORD dwHandle
RETURN VALUE :      int nRet

FIG. 23

| | |
|---|---|
| DLL NAME : | A.DLL |
| FUNCTION NAME : | FuncAA |
| ARGUMENT : | DWORD dwID : 256 |
| RETURN VALUE : | DWORD dwRet : 0 |
| IN TIME : | 2002/03/25 22 : 24 : 12.025 |
| OUT TIME : | 2002/03/25 22 : 24 : 12.035 |
| | |
| DLL NAME : | A.DLL |
| FUNCTION NAME : | FuncAB |
| ARGUMENT : | struct structData{ |
| |     char cIndex : 2 |
| |     short int nLength : 0x100 |
| |     long int nData : 0x4F27D3C5 |
| |     int64 n64Detail : 0x3DC857128B2F3C4F |
| | } |
| RETURN VALUE : | int nRet : 0 |
| IN TIME : | 2002/03/25 22 : 24 : 12.046 |
| OUT TIME : | 2002/03/25 22 : 24 : 12.057 |
| | |
| DLL NAME : | A.DLL |
| FUNCTION NAME : | FuncAB |
| ARGUMENT : | DWORD dwBufSize : 24 |
| | char * pBufSize : 0x503860C |
| |     Size=dwBufSize, DataID = 0x0002 |
| RETURN VALUE : | int nRet : 0 |
| IN TIME : | 2002/03/25 22 : 24 : 12.068 |
| OUT TIME : | 2002/03/25 22 : 24 : 12.079 |

```
struct structData{
    char cIndex : 2                        (← 1byte)
    int64 n64Detail : 0x3DC857128B2F3C4F(← 8byte)
}
```

PACKING OPTION
   (8 BYTES)

00000000 : 02 FF FF FF FF FF FF FF
   00000008 : 4F 3C 2F 8B 12 57 C8 3D
   00000010 : FF FF FF FF FF FF FF FF

PACKING OPTION
   (4 BYTES)

00000000 : 02 FF FF FF 4F 3C 2F 8B
   00000008 : 12 57 C8 3D FF FF FF FF
   00000010 : FF FF FF FF FF FF FF FF

PACKING OPTION
   (2 BYTES)

00000000 : 02 FF 4F 3C 2F 8B 12 57
   00000008 : C8 3D FF FF FF FF FF FF
   00000010 : FF FF FF FF FF FF FF FF

PACKING OPTION
   (1 BYTES)

```
struct structData {
    char cIndex : 2                          ( ← 1byte)
    long int nDeta : 0x4F27D3C5              ( ← 4byte)
}
```

PACKING OPTION
(8 BYTES)

00000000 : 02 FF FF FF C5 D3 27 4F
00000008 : FF FF FF FF FF FF FF FF
00000010 : FF FF FF FF FF FF FF FF

PACKING OPTION
(4 BYTES)

00000000 : 02 FF FF FF C5 D3 27 4F
00000008 : FF FF FF FF FF FF FF FF
00000010 : FF FF FF FF FF FF FF FF

PACKING OPTION
(2 BYTES)

00000000 : 02 FF C5 D3 27 4F FF FF
00000008 : FF FF FF FF FF FF FF FF
00000010 : FF FF FF FF FF FF FF FF

PACKING OPTION
(1 BYTES)

```
struct structData{
    char cIndex : 2          ( ← 1byte)
    short int nLength : 0x100 ( ← 2byte)
}
```

PACKING OPTION
(8 BYTES)

00000000 : 02 FF 00 01 FF FF FF FF
00000008 : FF FF FF FF FF FF FF FF
00000010 : FF FF FF FF FF FF FF FF

PACKING OPTION
(4 BYTES)

00000000 : 02 FF 00 01 FF FF FF FF
00000008 : FF FF FF FF FF FF FF FF
00000010 : FF FF FF FF FF FF FF FF

PACKING OPTION
(2 BYTES)

00000000 : 02 FF 00 01 FF FF FF FF
00000008 : FF FF FF FF FF FF FF FF
00000010 : FF FF FF FF FF FF FF FF

PACKING OPTION
(1 BYTES)

| | |
|---|---|
| DLL NAME : | A.DLL |
| FUNCTION NAME : | FuncAA |
| ARGUMENT : | DWORD dwID |
| RETURN VALUE : | DWORD dwRet |
| | |
| DLL NAME : | A.DLL |
| FUNCTION NAME : | FuncAB |
| ARGUMENT : | DWORD dwBufsize |
| | char *pBuf |
| RETURN VALUE : | int nRet |
| | |
| DLL NAME : | B.DLL |
| FUNCTION NAME : | FuncBA |
| ARGUMENT : | DWORD dwID |
| RETURN VALUE : | DWORD dwRet |
| | |
| DLL NAME : | B.DLL |
| FUNCTION NAME : | FuncBB |
| ARGUMENT : | DWORD dwHandle |
| RETURN VALUE : | int nRet |

FIG. 29

| | |
|---|---|
| DLL NAME : | A.DLL |
| FUNCTION NAME : | FuncAA |
| ARGUMENT : | DWORD dwID : 256 |
| RETURN VALUE : | DWORD dwRet : 0 |
| IN TIME : | 2002/03/25 22 : 24 : 12.025 |
| OUT TIME : | 2002/03/25 22 : 24 : 12.035 |
| | |
| DLL NAME : | A.DLL |
| FUNCTION NAME : | FuncAB |
| ARGUMENT : | DWORD dwBufsize : 24 |
| | char *pBuf : 0x5034206D |
| RETURN VALUE : | int nRet : 0 |
| IN TIME : | 2002/03/25 22 : 24 : 12.046 |
| OUT TIME : | 2002/03/25 22 : 24 : 12.057 |
| | |
| DLL NAME : | A.DLL |
| FUNCTION NAME : | FuncAB |
| ARGUMENT : | DWORD dwBufSize : 24 |
| | char * pBuf : 0x503860C |
| RETURN VALUE : | int nRet : 0 |
| IN TIME : | 2002/03/25 22 : 24 : 12.068 |
| OUT TIME : | 2002/03/25 22 : 24 : 12.079 |

| Memory Offset | Index Area | Data Area |
|---|---|---|
| 0x00000000 | Index : 0 | DLL NAME : A.DLL<br>FUNCTION NAME : FuncAA<br>ARGUMENT : DWORD dwID : 256<br>RETURN VALUE : DWORD dwRet : 0<br>IN TIME : 2002/03/25 22 : 24 : 12.025<br>OUT TIME : 2002/03/25 22 : 24 : 12.035 |
| 0x00000035 | Index : 1 | DLL NAME : A.DLL<br>FUNCTION NAME : FuncAB<br>ARGUMENT : DWORD dwBufsize : 24<br>    char *pBuf : 0x5034206D<br>RETURN VALUE : int nRet : 0<br>IN TIME : 2002/03/25 22 : 24 : 12.046<br>OUT TIME : 2002/03/25 22 : 24 : 12.057 |
| 0x00000086 | Index : 2 | DLL NAME : A.DLL<br>FUNCTION NAME : FuncAB<br>ARGUMENT : DWORD dwBufSize : 24<br>    char * pBuf : 0x503860C<br>RETURN VALUE : int nRet : 0<br>IN TIME : 2002/03/25 22 : 24 : 12.068<br>OUT TIME : 2002/03/25 22 : 24 : 12.079 |
| 0x000000C2 | Index : 3<br><br>... | DLL NAME : B.DLL<br>FUNCTION NAME : FuncBA<br>ARGUMENT : DWORD dwID : 1<br>RETURN VALUE : DWORD dwRet : 0<br>IN TIME : 2002/03/25 22 : 24 : 12.124<br>OUT TIME : 2002/03/25 22 : 24 : 12.158<br><br>... |

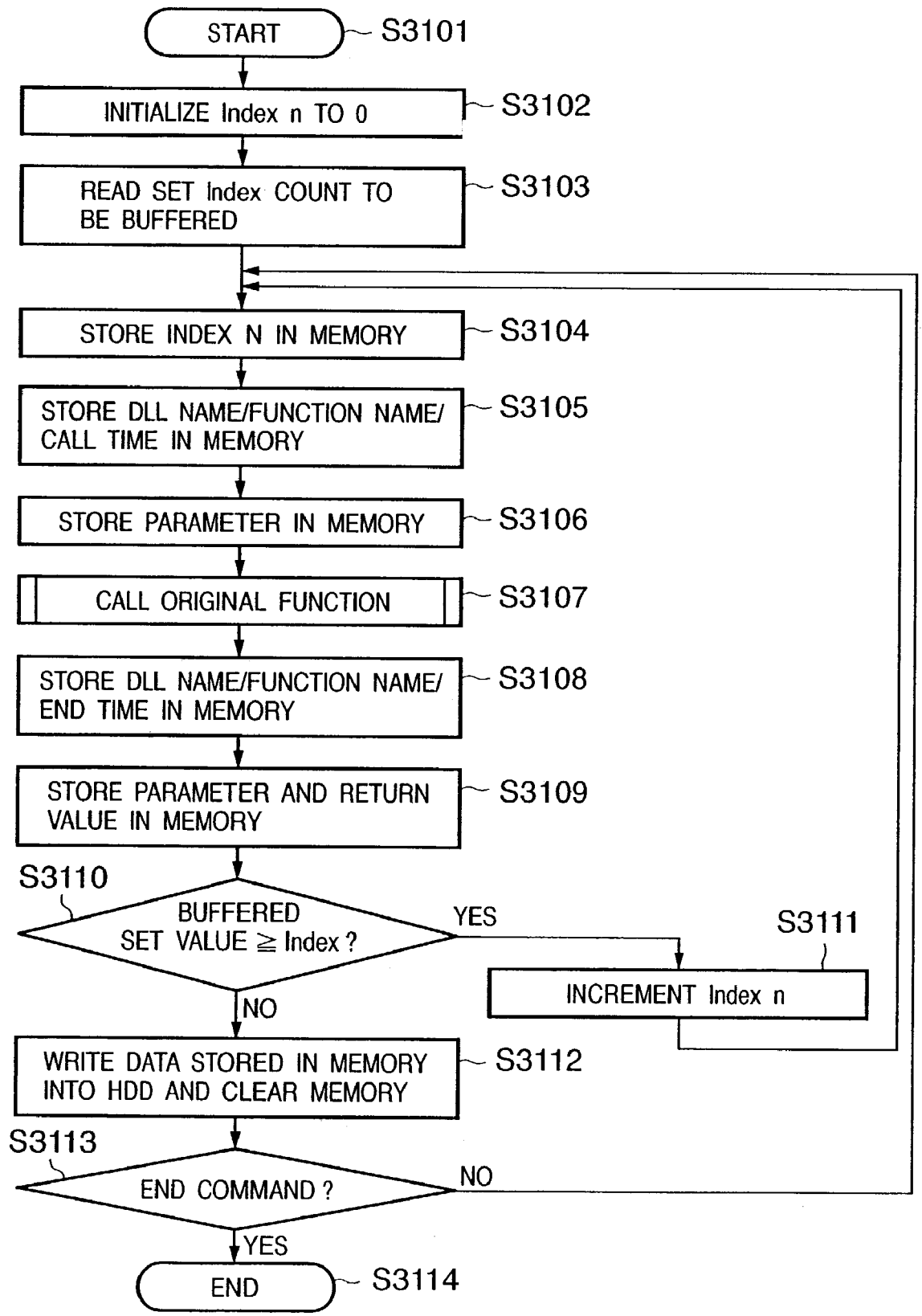

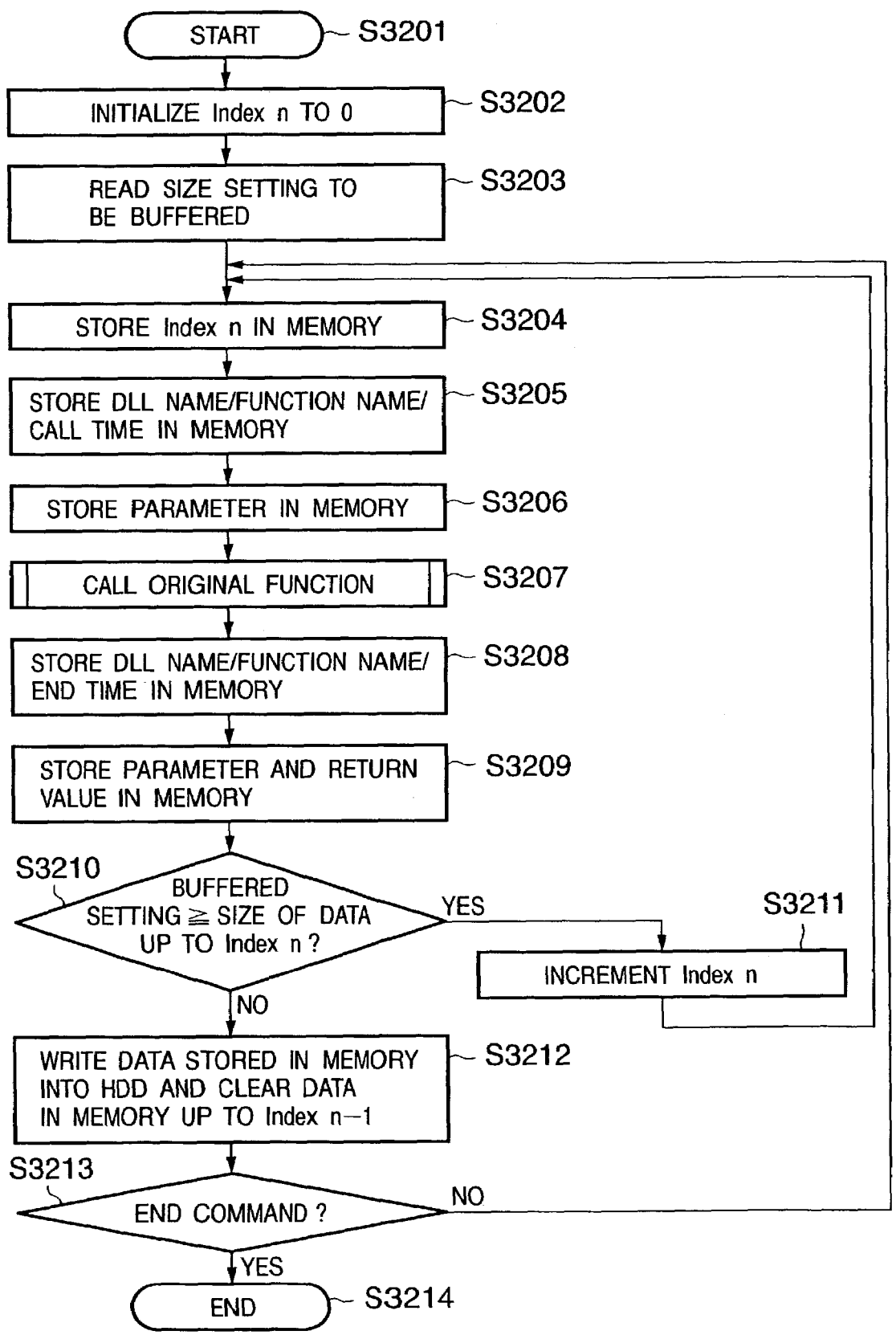

FIG. 33

| ACQUISITION DATA SETTING |
|---|

☐ STORE LOG DATA IN BUFFER

☐ SPECIFY THE NUMBER OF RECORDS

[ 256 ] RECORDS OR LESS

☐ SPECIFY SIZE

[ 1024 ] KB OR LESS

FIG. 34

| | |
|---|---|
| DLL NAME : | A.DLL |
| FUNCTION NAME : | FuncAA |
| ARGUMENT : | DWORD dwID |
| RETURN VALUE : | DWORD dwRet |
| | |
| DLL NAME : | A.DLL |
| FUNCTION NAME : | FuncAB |
| ARGUMENT : | DWORD dwBufsize |
| | char *pBuf(Size=dwBufSize) |
| RETURN VALUE : | int nRet |
| | |
| DLL NAME : | B.DLL |
| FUNCTION NAME : | FuncBA |
| ARGUMENT : | DWORD dwID |
| RETURN VALUE : | DWORD dwRet |
| | |
| DLL NAME : | B.DLL |
| FUNCTION NAME : | FuncBB |
| ARGUMENT : | DWORD dwHandle |
| RETURN VALUE : | int nRet |

FIG. 35

| | |
|---|---|
| DLL NAME : | A.DLL |
| FUNCTION NAME : | FuncAA |
| ARGUMENT : | DWORD dwID : 256 |
| RETURN VALUE : | DWORD dwRet : 0 |
| IN TIME : | 2002/03/25  22 : 24 : 12.025 |
| OUT TIME : | 2002/03/25  22 : 24 : 12.035 |
| | |
| DLL NAME : | A.DLL |
| FUNCTION NAME : | FuncAB |
| ARGUMENT : | DWORD dwBufsize : 24 |
| | char *pBuf : 0x5034206D |
| | Size=dwBufSize, DataID=0x0001 |
| RETURN VALUE : | int nRet : 0 |
| IN TIME : | 2002/03/25  22 : 24 : 12.046 |
| OUT TIME : | 2002/03/25  22 : 24 : 12.057 |
| | |
| DLL NAME : | A.DLL |
| FUNCTION NAME : | FuncAB |
| ARGUMENT : | DWORD dwBufSize : 24 |
| | char * pBuf : 0x503860C |
| | Size=dwBufSize, DataID=0x0002 |
| RETURN VALUE : | int nRet : 0 |
| IN TIME : | 2002/03/25  22 : 24 : 12.068 |
| OUT TIME : | 2002/03/25  22 : 24 : 12.079 |

DataID : 0x0001

00000000 : 01 5D 33 B2 20 49 20 39
00000008 : 02 5D 33 B2 20 49 30 39
00000010 : 01 6D 33 B2 20 59 20 39

DataID : 0x0002

00000000 : 01 5D 44 B2 20 49 20 39
00000008 : 02 5D 44 B2 20 49 30 39
00000010 : 01 6D 44 B2 20 59 20 39

DataID : 0x0003

00000000 : 01 5D 55 B2 20 49 20 39
00000008 : 02 5D 55 B2 20 49 30 39
00000010 : 01 6D 55 B2 20 59 20 39

DataID : 0x0004

00000000 : 01 5D 66 B2 20 49 20 39
00000008 : 02 5D 66 B2 20 49 30 39
00000010 : 01 6D 66 B2 20 59 20 39

...

F I G. 40

ACQUISITION DATA SETTING

☐ STORE INPUT PARAMETER

☐ STORE OUTPUT PARAMETER

☐ STORE BINARY PARAMETER

☐ NOT STORE DATA EXCEEDING SIZE SPECIFIED BELOW

```
LOG DISPLAY

DLL NAME : A.DLL
FUNCTION NAME :    Func AA
ARGUMENT : DWORD  dwID : 256
RETURN VALUE :     DWORD dwRet : 0
IN TIME :          2002/03/25 22 : 24 : 12. 025
OUT TIME :         2002/03/25 22 : 24 : 12. 035

DLL NAME : A.DLL
FUNCTION NAME :    Func AB
ARGUMENT : DWORD  dwBufsize : 24
                  char *Buf : 0x5034206D
                      Size=dwBufSize, DataID=0x0001
RETURN VALUE :     int nRet : 0
IN TIME :          2002/03/25 22 : 24 : 12. 046
OUT TIME :         2002/03/25 22 : 24 : 12. 057

DLL NAME : A.DLL
FUNCTION NAME :    Func AB
ARGUMENT : DWORD  dwBufSize : 24
                  char *pBuf : 0x503860C
                      Size=dwBufSize, DataID=0x0002
RETURN VALUE :     int dwRet : 0
IN TIME :          2002/03/25 22 : 24 : 12. 068
OUT TIME :         2002/03/25 22 : 24 : 12. 079
```

```
BINARY LOG DISPLAY

00000000 : 01 5D 33 B2 20 49 20 39
00000008 : 02 5D 33 B2 20 49 30 39
00000010 : 01 6D 33 B2 20 59 20 39
```

METHOD, PROGRAM, AND STORAGE MEDIUM FOR ACQUIRING LOGS

FIELD OF THE INVENTION

The present invention relates to a technology for acquiring processing logs for software consisting of a plurality of modules.

BACKGROUND OF THE INVENTION

Software failures that do not repeatedly occur have been solved by acquiring and analyzing the processing log of the software to identify the cause of the failures.

Processing log acquisition according to such prior-art methods has the following problems:

(1) Software modules must be modified to add a routine for acquiring a process log. Accordingly, the workload for acquiring the process log is heavy.

(2) Processing log acquisition is performed for each module, and therefore logs are generated on a module-by-module basis. It is difficult to obtain a chronological log of the processing of the entire software (the software as a whole). Consequently, a large number of man-hours are required for analyzing a log to identify the cause of a failure because the log does not provide a broad view of the entire processing.

SUMMARY OF THE INVENTION

The present invention has been made to solve the problems described above. An object of the present invention is to provide a method that allows a log of a software program separated into modules to be readily obtained and reduces the number of man-hours needed to analyze the cause of software failure, a program for causing a computer to perform the method, and a storage medium containing the program.

To achieve the object, the present invention provides a log acquisition method for acquiring a runtime log of a program including a function for performing a predetermined process, comprising the step of: changing the address of the function loaded for performing the predetermined process to the address of a function for log acquisition, wherein the function for log acquisition comprises the steps of: calling the function for performing the predetermined process to cause the predetermined process to be executed, receiving the result of the execution, and passing the result to the program;

recording given information when calling the function for performing the predetermined process; and recording given information when receiving the result of the execution.

To achieve the object described above, the present invention provides another log acquisition method for obtaining a runtime log of a program including a function for performing a predetermined process, comprising the steps of: changing the address of the function loaded for performing the predetermined process to the address of a function for log acquisition; wherein the function for log acquisition comprises the steps of: calling the function for performing the predetermined process to cause the process to be executed, receiving the result of the execution, and passing the result to the program; determining whether or not a parameter or return value is defined as a structure in a function definition in the program; if a parameter or return value is defined as a structure, placing the content of the structure in memory on the basis of a packing option of the structure; and recording the content of the structure placed in the memory as a log in a disk device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A shows the process while using the IAT Patch according to the first embodiment;

FIG. 10 shows an example of a function definition file according to the first embodiment;

FIG. 11 shows examples of logs acquired in the software evaluation system implementing the log acquisition method according to the first embodiment of the present invention;

FIG. 15 shows an example of a function definition file according to the second embodiment;

FIG. 16 shows an example of logs acquired according to the second embodiment;

FIG. 18 shows an example of a function definition file according to a fourth embodiment;

FIG. 19 shows examples of logs acquired according to a fourth embodiment;

FIG. 22 shows an example of a function definition file according to a sixth embodiment;

FIG. 23 shows examples of logs acquired according to the sixth embodiment;

FIG. 24 shows a specific example of structure-packing options;

FIG. 25 shows another example of structure-packing options;

FIG. 26 shows another example of structure-packing options;

FIG. 28 shows an example of a function definition file according to a seventh embodiment;

FIG. 29 shows examples of logs acquired according to the seventh embodiment;

FIG. 30 shows a memory organization when the logs shown in FIG. 29 are stored in the memory;

FIG. 31 shows a flowchart of a process according to the seventh embodiment;

FIG. 32 shows a flowchart of a process according to an eighth embodiment;

FIG. 33 shows an example of a user interface for setting features described with respect to the seventh and eighth embodiments;

FIG. 34 shows an example of a function definition file according to a tenth embodiment;

FIG. 35 shows examples of logs acquired according to the tenth embodiment;

FIG. 36 shows the content in a binary log file stored along with the logs shown in FIG. 35;

FIG. 40 shows an example of a user interface for setting features provided with respect to the tenth and eleventh embodiments; and FIG. 41 shows a user interface for associating Data ID described in a basic log and the Data Id data in a binary log.

DETAILED DESCRIPTION OF THE PREFERRED EMBODIMENTS

First Embodiment

In a first embodiment, an import function address table or virtual address table contained in memory, which is an arrangement for calling a function in a module from another module, is used to hook and log function calls between modules, thereby enabling a chronological log of an entire software program to be acquired without any modifications to the software modules. The first embodiment will be described below in detail.

System Configuration

Figure 1:
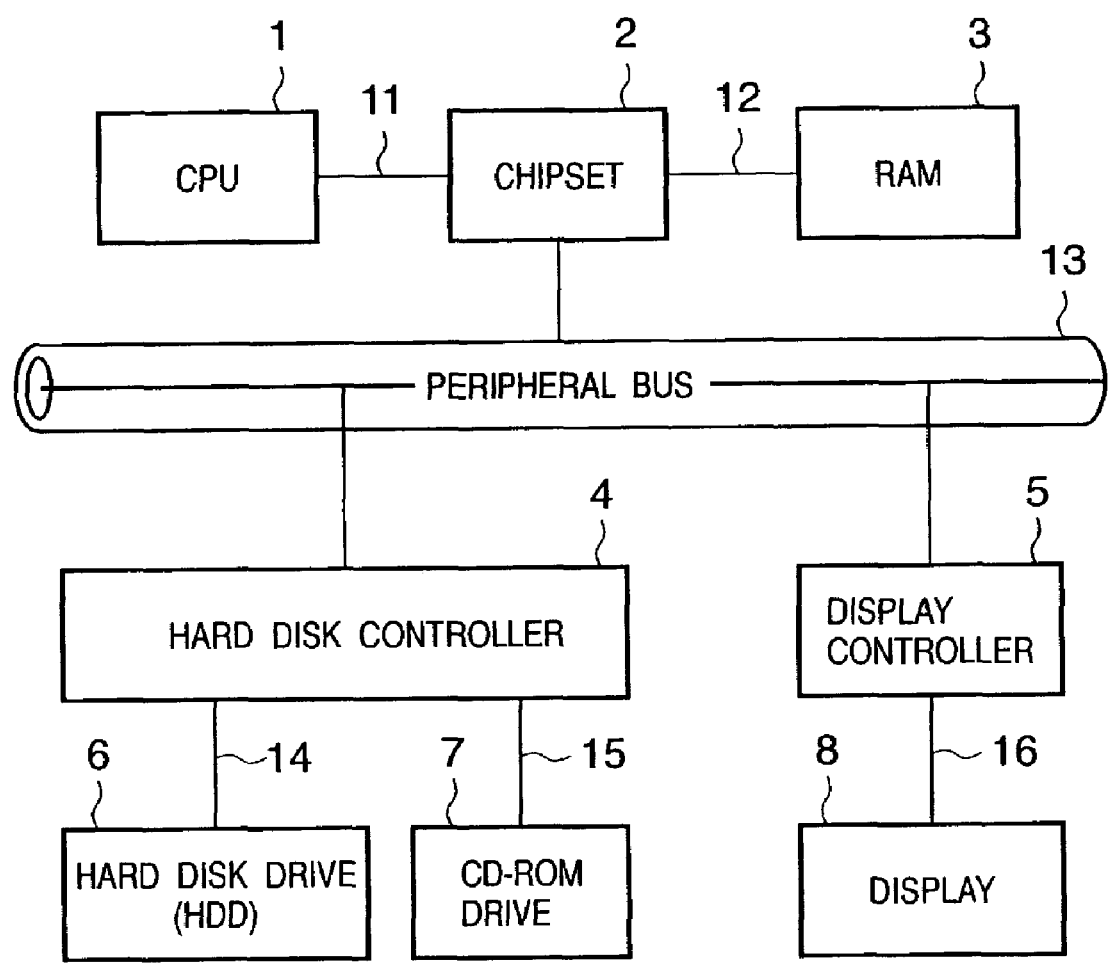
FIG. 1 shows a configuration of a computer (software evaluation system) for implementing a method for acquiring logs according to a first embodiment.

FIG. 1 shows a configuration of a computer (software evaluation system) performing a log acquisition method according to embodiments of the present invention. For simplicity, it is assumed herein that the software evaluation system is built within a single personal computer. However, the features of the log acquisition method of the present invention are effective whether the system is built in a single PC or a plurality of PCs as a network system.

The computer in which the software evaluation system is provided comprises a CPU 1, a chip set 2, a RAM 3, a hard disk controller 4, a display controller 5, a hard disk drive 6, a CD-ROM drive 7, and a display 8. It also comprises a signal line 11 connecting the CPU 1 with the chip set 2, a signal line 12 connecting the chip set 2 with the RAM 3, a peripheral bus 13 connecting the chip set 2 with peripheral devices, a signal line 14 connecting the hard disk controller 4 with the hard disk drive 6, a signal line 15 connecting the hard disk controller 4 with the CD-ROM drive 7, and a signal line 16 connecting the display controller 5 with the display 8.

Acquisition of Log Concerning Function Process

Figure 2:
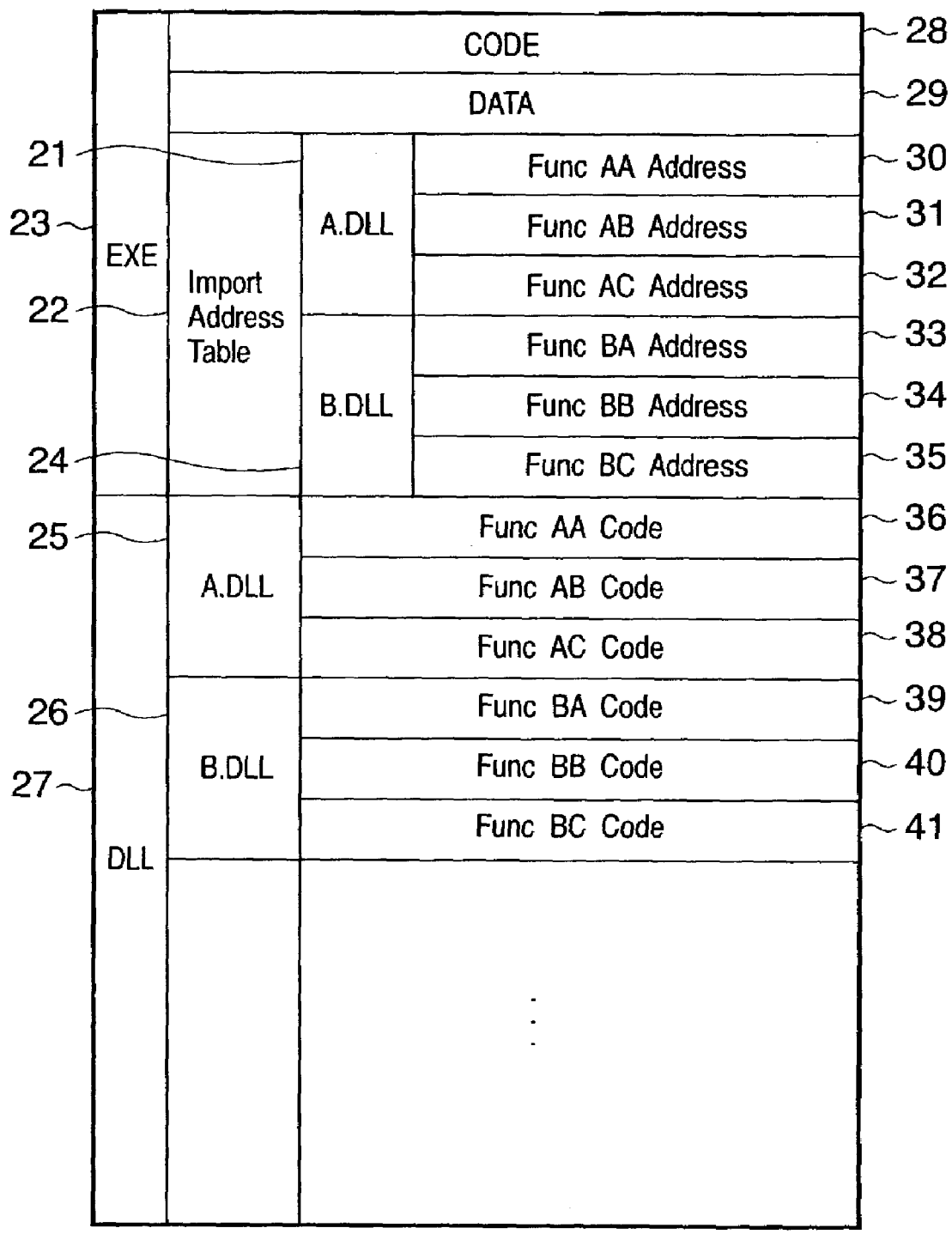
FIG. 2 shows an ordinary organization of memory in which functions are loaded.

In order to facilitate the understanding of the software evaluation system that implements the log acquisition method according to the first embodiment of the present invention, how a software program separated into a plurality of modules is ordinarily loaded in a memory will first be described with reference to FIG. 2.

A software program consisting of modules in general is separated into a set of executable files EXE (23) and a set of dynamic link libraries DLL (27) existing as modules and serving as a complement to the EXE. The EXE consists of a code segment (28), a data segment (29), and an import function address table (22). The import function address table is further divided into DLLs (21, 24) to which functions belong. Each DLL contains addresses (30 to 35) at which each function is loaded. The contents of the functions of each DLL are separately loaded (25, 26) and each function (36 to 41) is loaded as part of the associated DLL. FIG. 2 shows an example in which one EXE uses the functions in two dynamic link libraries, A.DLL and B.DLL. Six functions, Func AA, Func AB, Func AC, Func BA, Func BB, and Func BC are used.

When a code in a code segment of the EXE calls function Func AA, the address (30) of Func AA written in the import function address table is first read. In effect, the address of AA code (36) read as part of A.DLL is written here. The code of the EXE can call Func AA of A.DLL by calling the address of the AA code (36).

Figure 3:
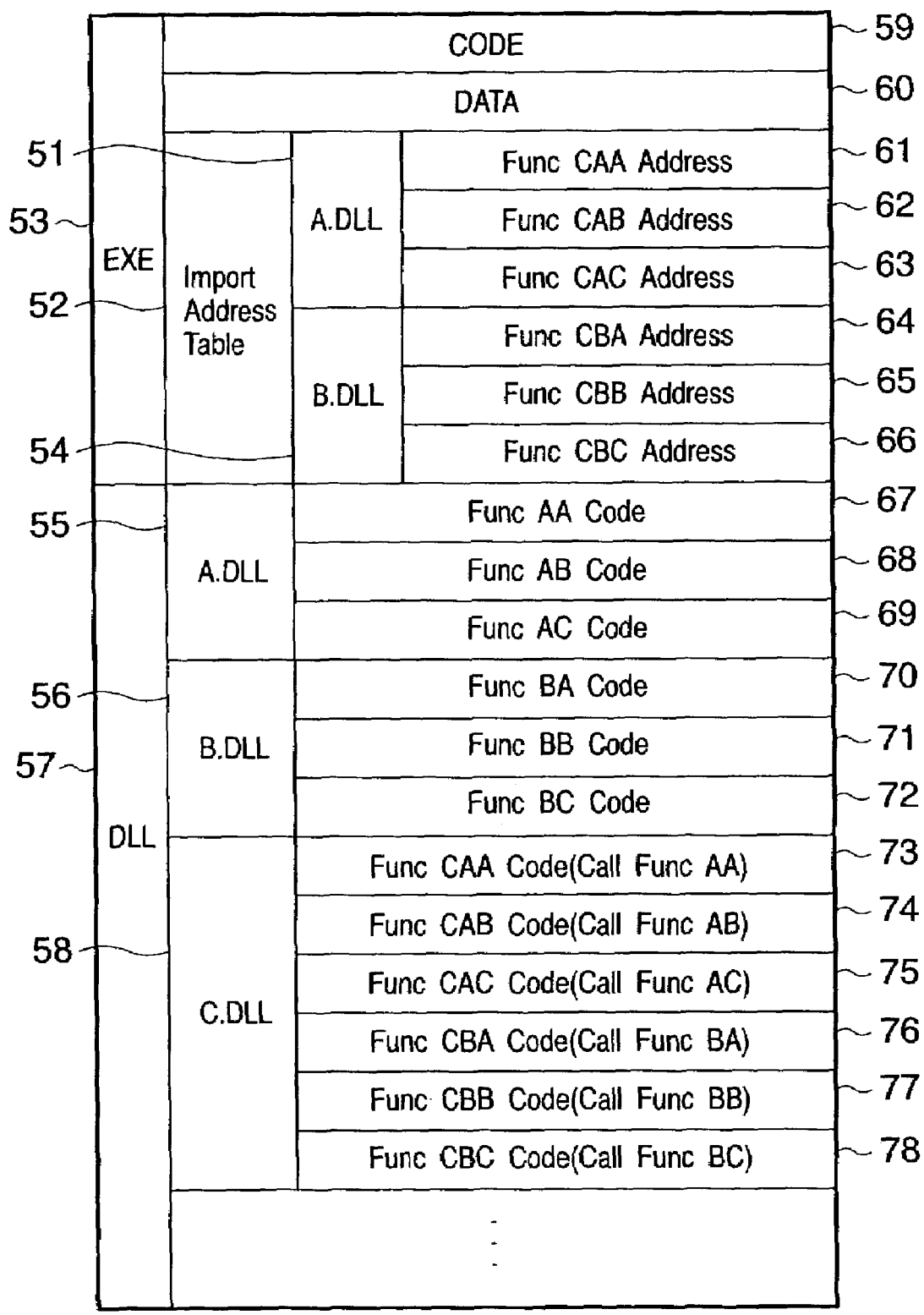
FIG. 3 shows an organization of the memory using the IAT Patch according to the first embodiment.

FIG. 3 shows an organization of the memory of the software evaluation system that implements the log acquisition method according to the first embodiment of the present invention. This organization differs from the one shown in FIG. 2 in that a technology called IAT Patch (Import Address Table Patch) is used with log acquisition codes to redirect function calls.

When log acquisition is initiated, C.DLL (58), which is a DLL for the IAT Patch is loaded in the memory. C.DLL changes the addresses of functions written in the import function address table (52) to the addresses (61 to 66) of log acquisition codes, Func CAA, Func CAB, Func CAC, Func CBA, Func CBB, and Func CBC, in C.DLL. The codes Func CAA, Func CAB, Func CAC, Func CBA, Func CBB, and Func CBC in C.DLL (73 to 78) perform logging and calls the corresponding functions, Func AA, Func AB, Func AC, Func BA, Func BB, and Func BC (67 to 72) loaded in the memory for responding to the function calls.

Figure 4B:
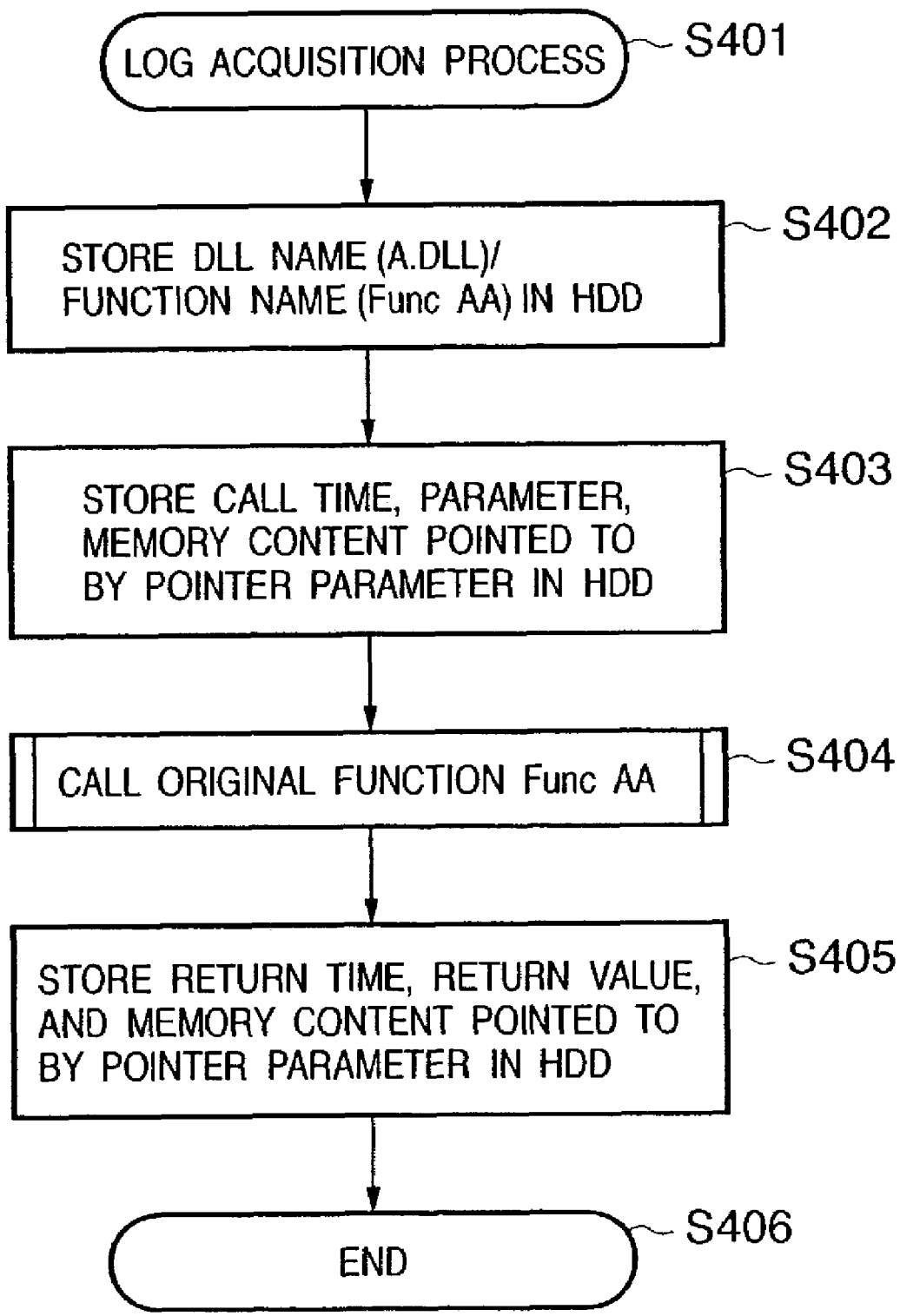
FIG. 4B shows a flowchart of a process for acquiring a log according to the first embodiment.

FIG. 4A shows an IAT Patch process performed in the example shown in FIG. 3. FIG. 4B is a flowchart of a log acquisition process. For simplicity, the figures show how the log acquisition code works with IAT Patch when the EXE calls Func AA in A.DLL.

When the EXE (91) calls Func AA (94), the log acquisition code in C.DLL stores the DLL name/function name (step S402), the call time, and parameter used in the call in the memory and stores the memory content pointed to by a pointer parameter used in the call in another memory (95 and step S403). C.DLL then calls Func AA in A.DLL (93), which is intended to be called (96 and step S404). When the Func AA process (96) in A.DLL ends and control is returned to C.DLL (98), C.LL stores the return time and return value in memory and stores the memory content pointed to by the pointer parameter in the return in another memory. Then C.DLL writes the log information it has stored into a file (100 and step S405). The control then returns to the EXE as if Func AA in A.DLL was completed in a conventional way (101).

Figure 5:
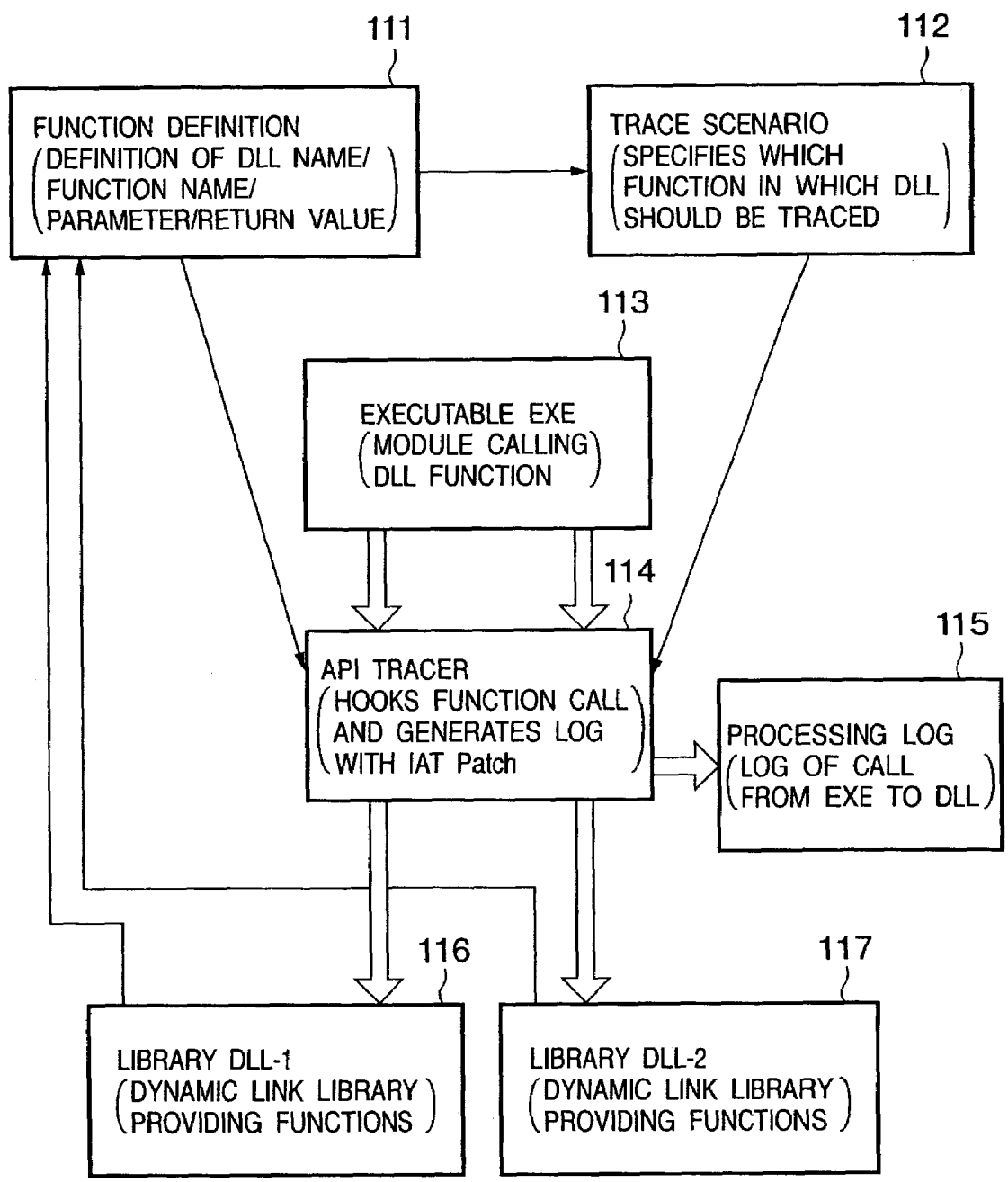
FIG. 5 shows an internal configuration of the software evaluation system while using the IAT Patch according to the first embodiment.

FIG. 5 shows an internal configuration of the software evaluation system that implements the log acquisition method according to the first embodiment. Conventionally, an executable EXE (113) calls a function in DLL-1 (116) or DLL-2 (117). In this method, in contrast, a log acquisition code called an API tracer (114) is embedded to generate a processing log (115). The API tracer (114) operates according to a file (111) that describes definitions of functions in DLL-1 or DLL-2 and a setting scenario (trace scenario) that specifies which function in which DLL in an import function table should be rewritten to obtain a log.

Acquisition of Log Concerning Method Process

Described below is how an executable file EXE (113) is loaded in a memory in the software evaluation system implementing the log acquisition method according to the first embodiment when an instance of an interface exported in a COM (Component Object Model) server. In order to explain this, how it is ordinarily loaded will first be described in FIG. 6.

Figure 6:
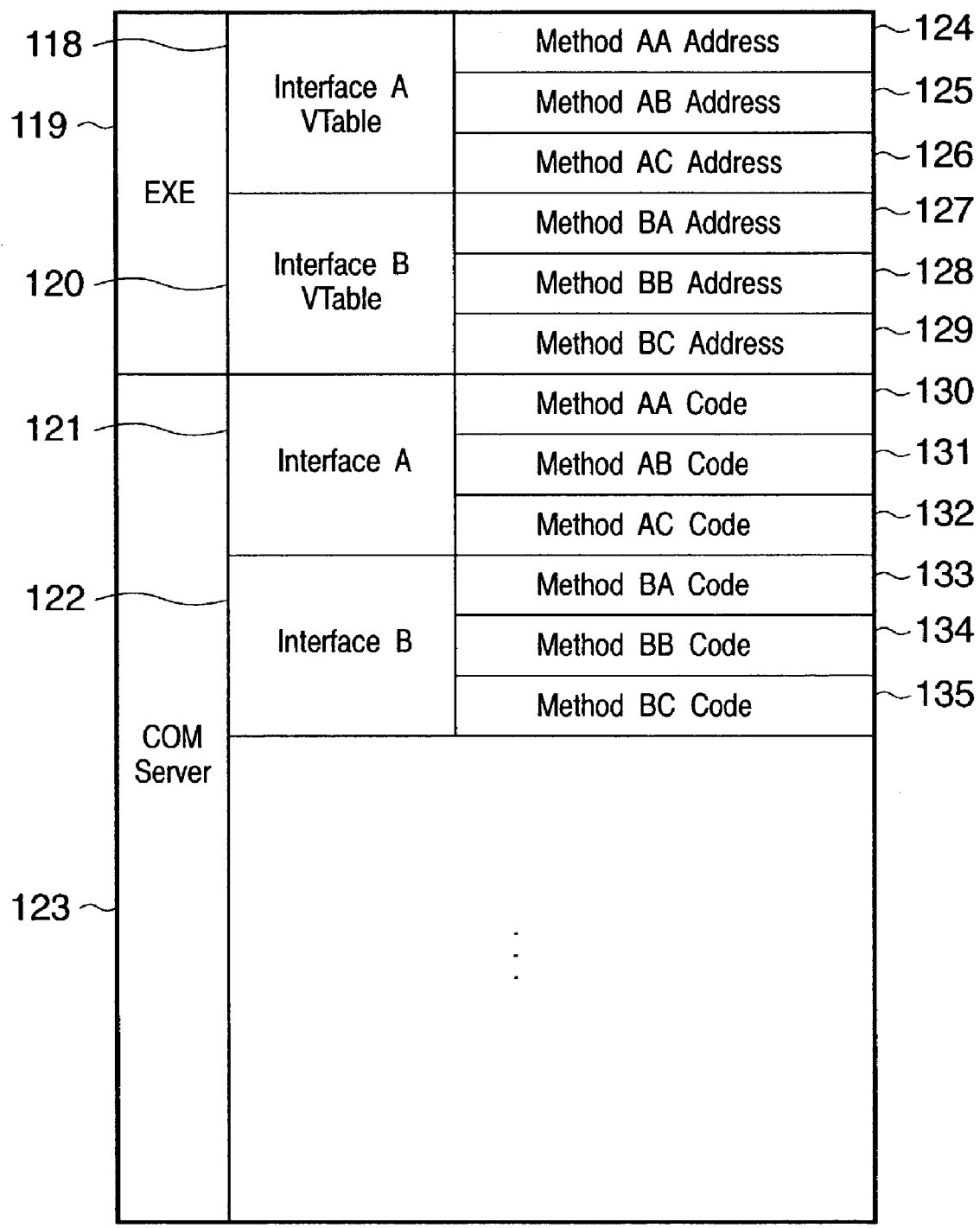
FIG. 6 shows an ordinary memory organization while an instance of COM server interface is generating.

When an instance of an interface is generated, the requested interface (121, 122) and its methods (130 to 135, programs describing procedures to be performed by objects in object-oriented programming) are ordinarily generated in the COM server (123). Both of them are loaded in a memory. A virtual address table (118, 120) is generated for each interface generated and provided to the EXE that has issued the request for generation of the instance. The generated addresses (124 to 129) of methods are contained in the virtual address table. The EXE uses this information to issues a call to each interface. Shown in FIG. 6 is an example in which the EXE (119) generates instances of two interfaces, Interface A (121) and Interface B (122), and uses methods in these interface. Specifically, Method AA, Method AB, Method AC, Method BA, Method BB, and Method BC (130 to 135) are used.

When a code of the EXE calls Method AA, the address (124) of Method AA is first read from the virtual address table. Actually written in the virtual address table is the address of the Method AA code (130) generated as part Interface A in the COM server (123). The EXE code can call Method AA of Interface A by calling that address.

Figure 7:
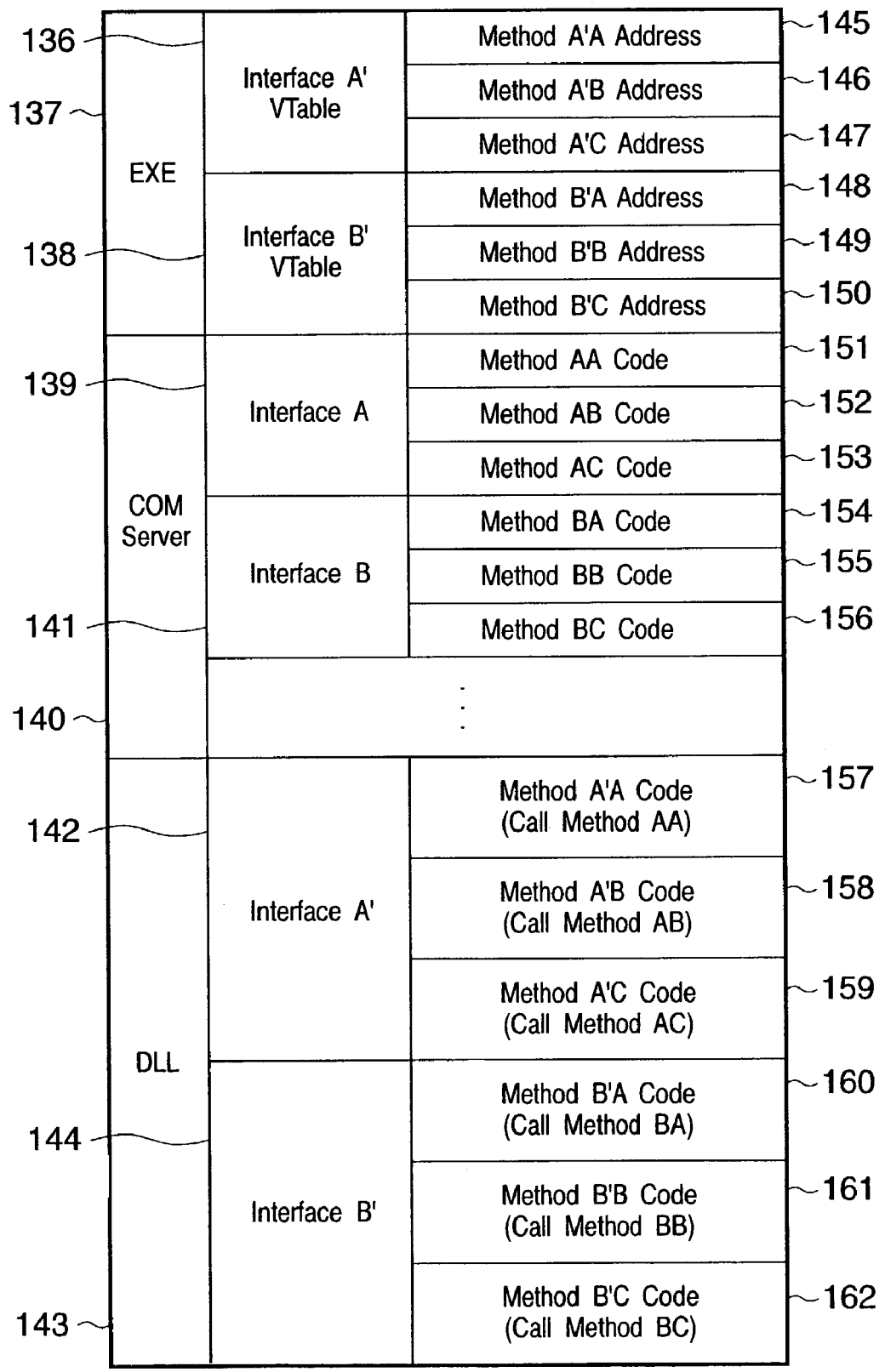
FIG. 7 shows a memory organization while using the VTable Patch.

FIG. 7 shows an organization of the memory of the software evaluation system according to the first embodiment. This organization differs from the one shown in FIG. 6 in that a technique called VTable Patch (virtual address table patch) is used with a log acquisition code to redirect a method call.

When log acquisition is initiated, a DLL (143) for VTable Patch is loaded in the memory. The DLL changes the addresses of the methods contained in the virtual address table (136, 138) to the addresses (145 to 150) of Method A'A, Method A'B, Method A'C, Method B'A, Method B'B, and Method B'C that are log acquisition codes in DLL. The codes Method A'A, Method A'B, Method A'C, Method B'A, Method B'B, and Method B'C (157 to 162) in the DLL (143) perform logging and call the corresponding methods, Method AA, Method AB, Method AC, Method BA, Method BB, and Method BC (157 to 162).

Figure 8A:
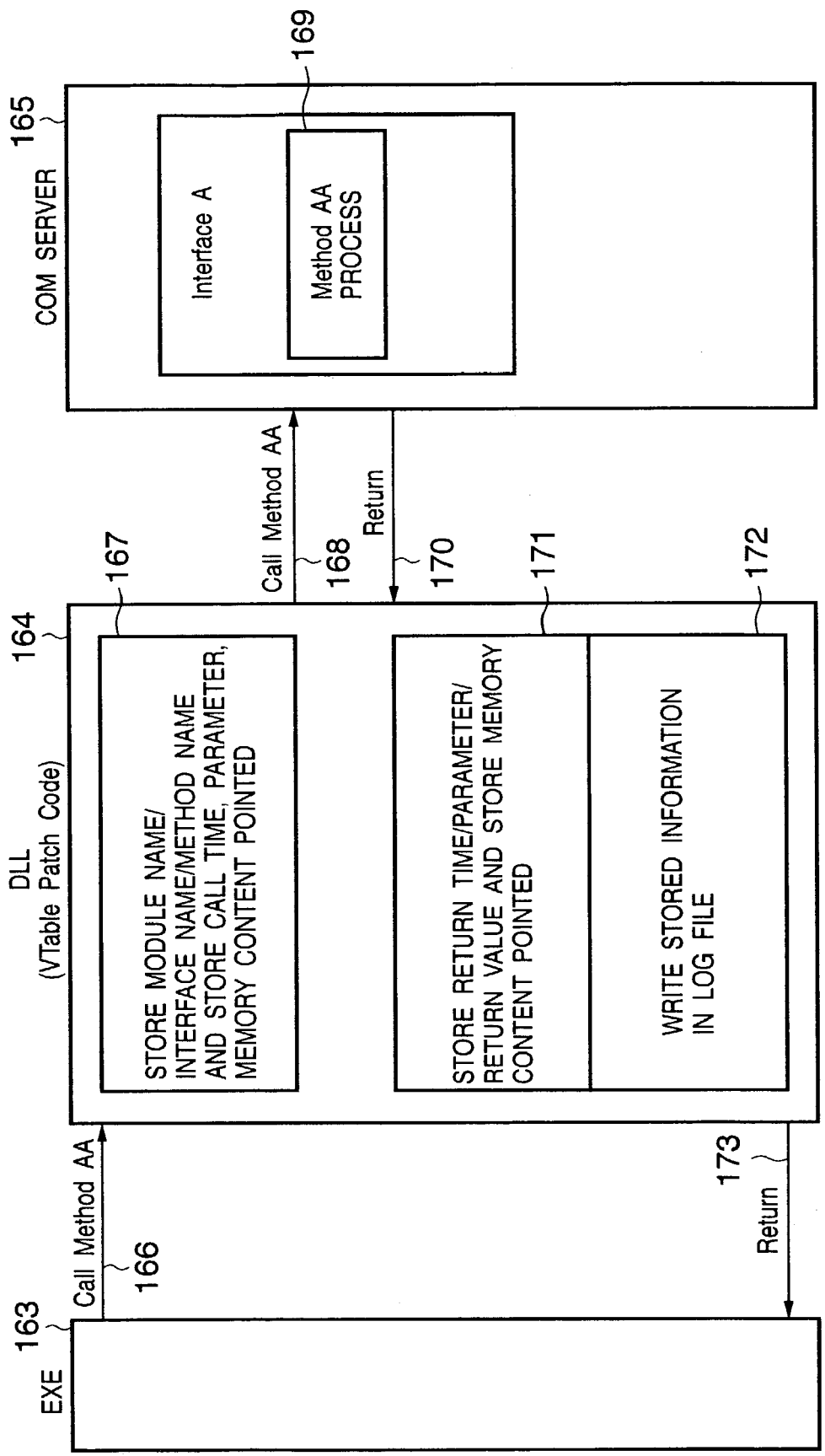
FIG. 8A shows the process while using the VTable Patch.
Figure 8B:
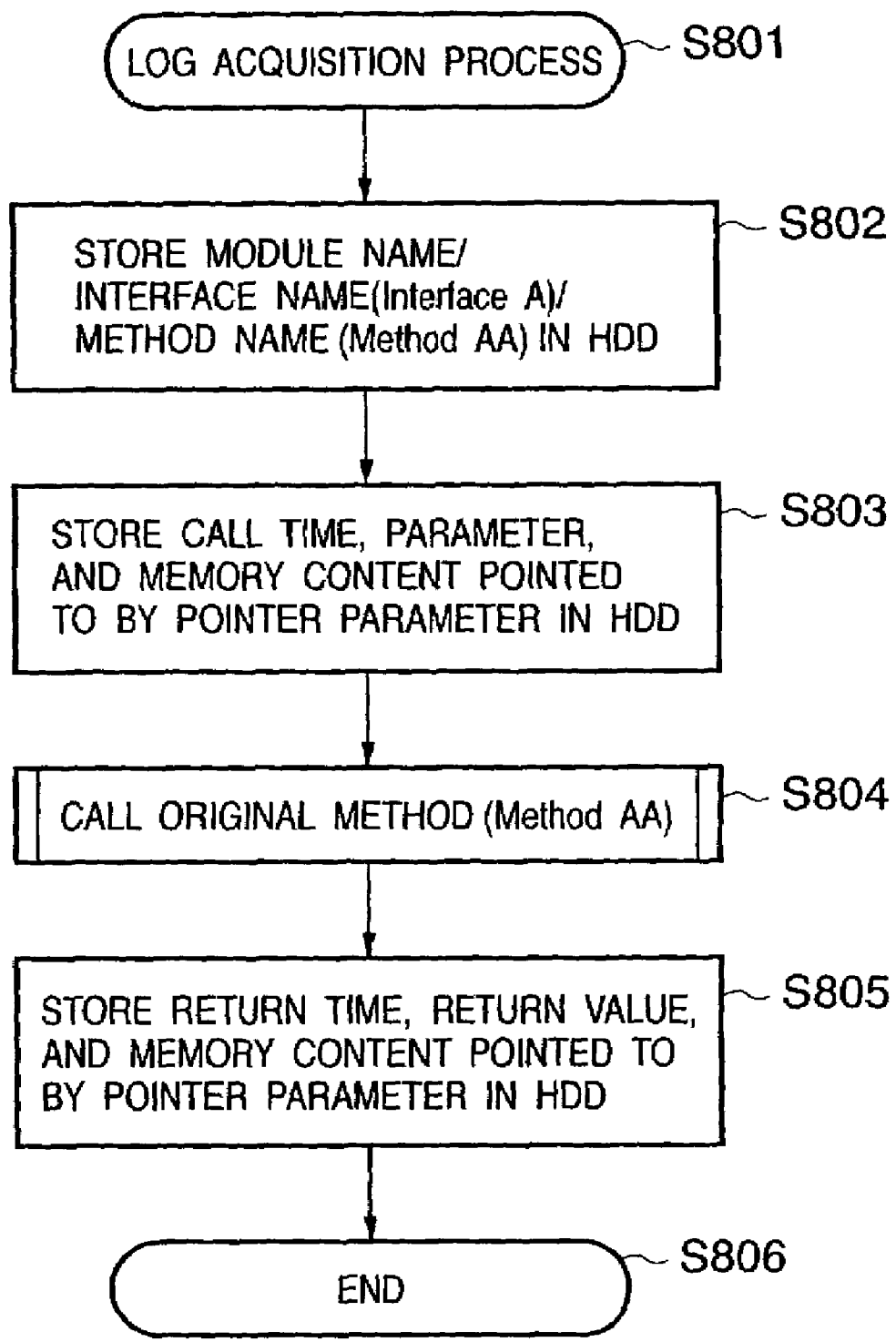
FIG. 8B shows a flowchart of a process for acquiring a log according to the first embodiment of the present invention.

FIG. 8A shows a flowchart of a process of VTable Patch in FIG. 7. FIG. 8B shows a flowchart of a log acquisition process. For simplicity, the figures show how the log acquisition code works with VTable Patch when the EXE calls Method AA in Interface A in the COM server (165).

When the EXE (163) calls Method AA (166), a log acquisition code in the DLL (164) stores the module name/interface name/method name in the DLL (step S802), the call time, parameters used in the call in memory and stores the memory content pointed to by a pointer parameter in another memory (167 and step S803). The DLL (164) then calls Method AA in the COM server (165) which is intended to be called (168 and step S804). When Method process AA (169) in COM server (165) comes to an end and control returns to the DLL (164), the DLL (164) stores the return time and return value in the memory and the memory content pointed to by the pointer parameter at the return time in another memory (171). The DLL then write the log information it stored in a file (172 and step S805) and returns the control to the EXE (163) as if Method AA in the COM server (165) ended in a conventional way (173).

Figure 9:
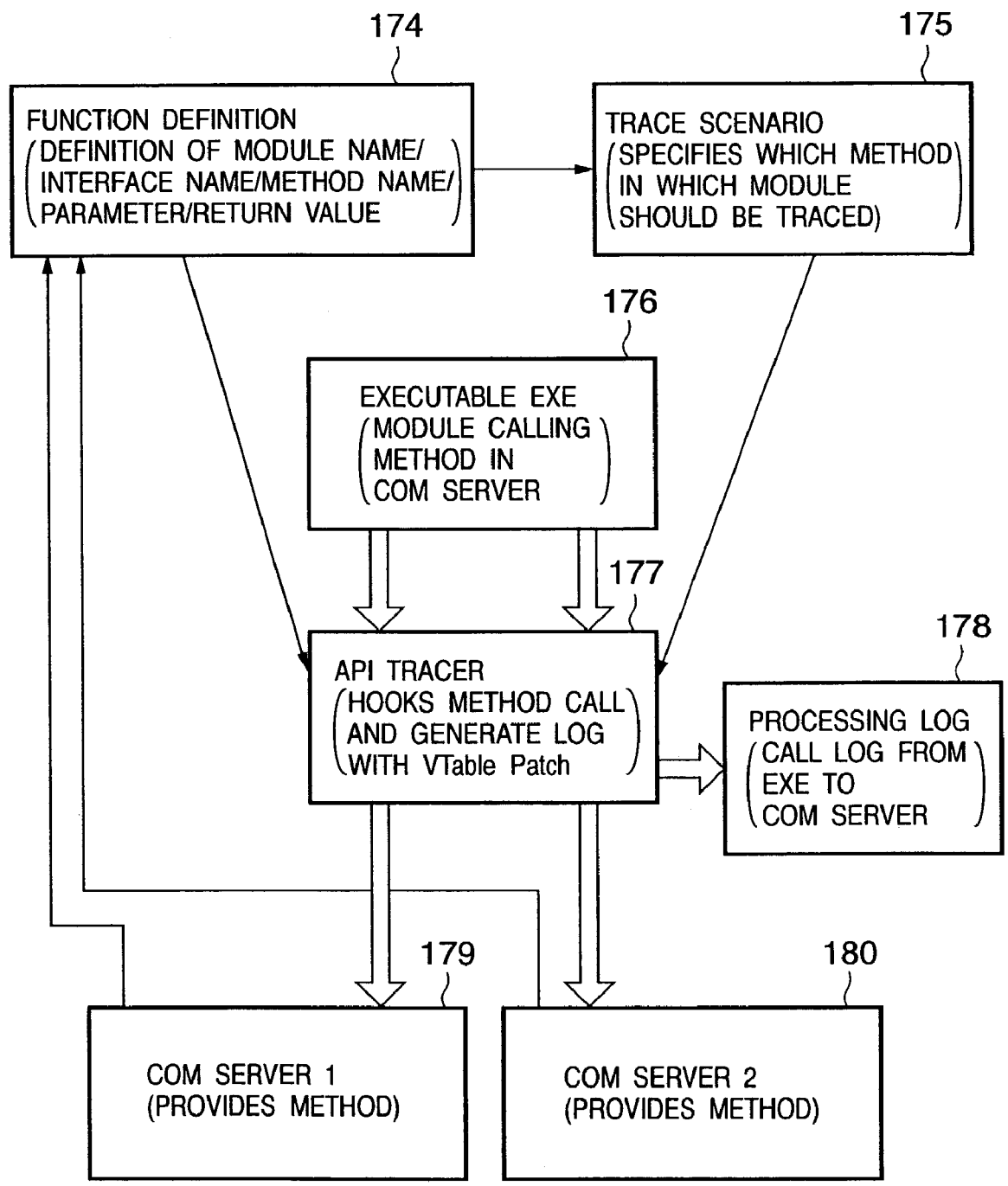
FIG. 9 shows an internal configuration of the software evaluation system according to the first embodiment.

FIG. 9 shows an internal configuration of the software evaluation system according to the first embodiment. Conventionally, an executable EXE (176) calls a method in the COM server 1 (179) or COM server 2 (180). In this method, in contrast, a log acquisition code called an API tracer (177) is embedded to generate a processing log (178). The API tracer (177) operates according to a file (174) that describes definitions of functions in the COM server 1 (179) or COM server 2 (180) and a setting scenario (175) that specifies which method in which interface in which COM server in a virtual address table should be rewritten to obtain a log.

EMBODIMENTS

FIG. 10 shows an example of a function definition file that specifies the formats of the parameter and return value of each function/method to the software evaluation system according to the first embodiment. DLL/interface names and function/method names are described (hereinafter the notation "function/method" represents "function or method") and the type of the parameters and return values of the functions/methods are indicated. The software evaluation system according to the first embodiment determines on the basis of the specifications in the function definition file what kind of parameter and return value each function/method has and acquires the data as a log.

FIG. 11 shows examples of logs acquired through the use of the function definition file shown in FIG. 10. For each call, the time at which the function/method was called and its parameter and return value are generated as a log.

As can be seen from the foregoing description, the log acquisition method according to the present embodiment for acquiring processing logs of software separated into a plurality of modules enables a function/method call provided in a module to be logged without modifying the module itself, thereby reducing workload for obtaining the processing logs. Furthermore, logs generated can be acquired as chronological logs, facilitating analysis of the logs and consequently reducing the number of man-hours needed for identifying the cause of software failure.

Second Embodiment

A process performed when a virtual address table contains a place gap will be described with respect to a second embodiment.

Figure 12:
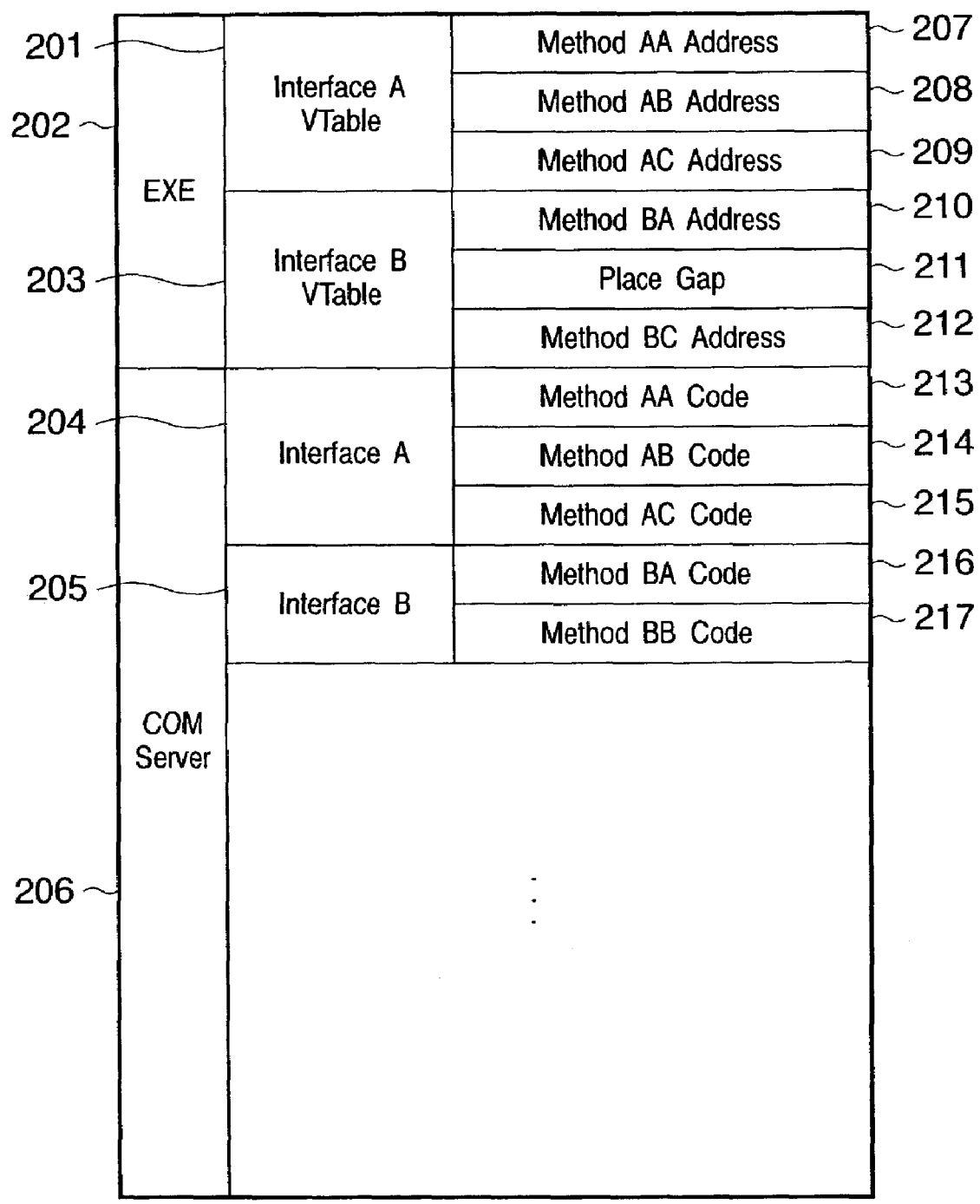
FIG. 12 shows an example of how an instance of an interface that is generated is loaded in memory according to a second embodiment.

FIG. 12 shows an example of how instances of interfaces generated are loaded in memory when a virtual address table contains a place gap in the software evaluation system implementing a log acquisition method according to the second embodiment. FIG. 12 will be described in comparison with FIG. 6. The example shown in FIG. 12 differs from the example shown in FIG. 6 in the portions concerning Method BB and Method BC. The address (211) of a dummy routine, called the place gap, is provided in the location in the VTable (203) for Interface B where Method BB would be placed so that the offset to the address (212) of Method BC in the VTable does not change when Method BB is implemented by deriving Interface B. In other words, a place gap indicates the area in a VTable that is reserved for a derived class for an interface having a virtual function. Method BB is not implemented in Interface B before derivation. Therefore there is not gap between Method BA (216) and Method BC (217) in the actual code.

Figure 13:
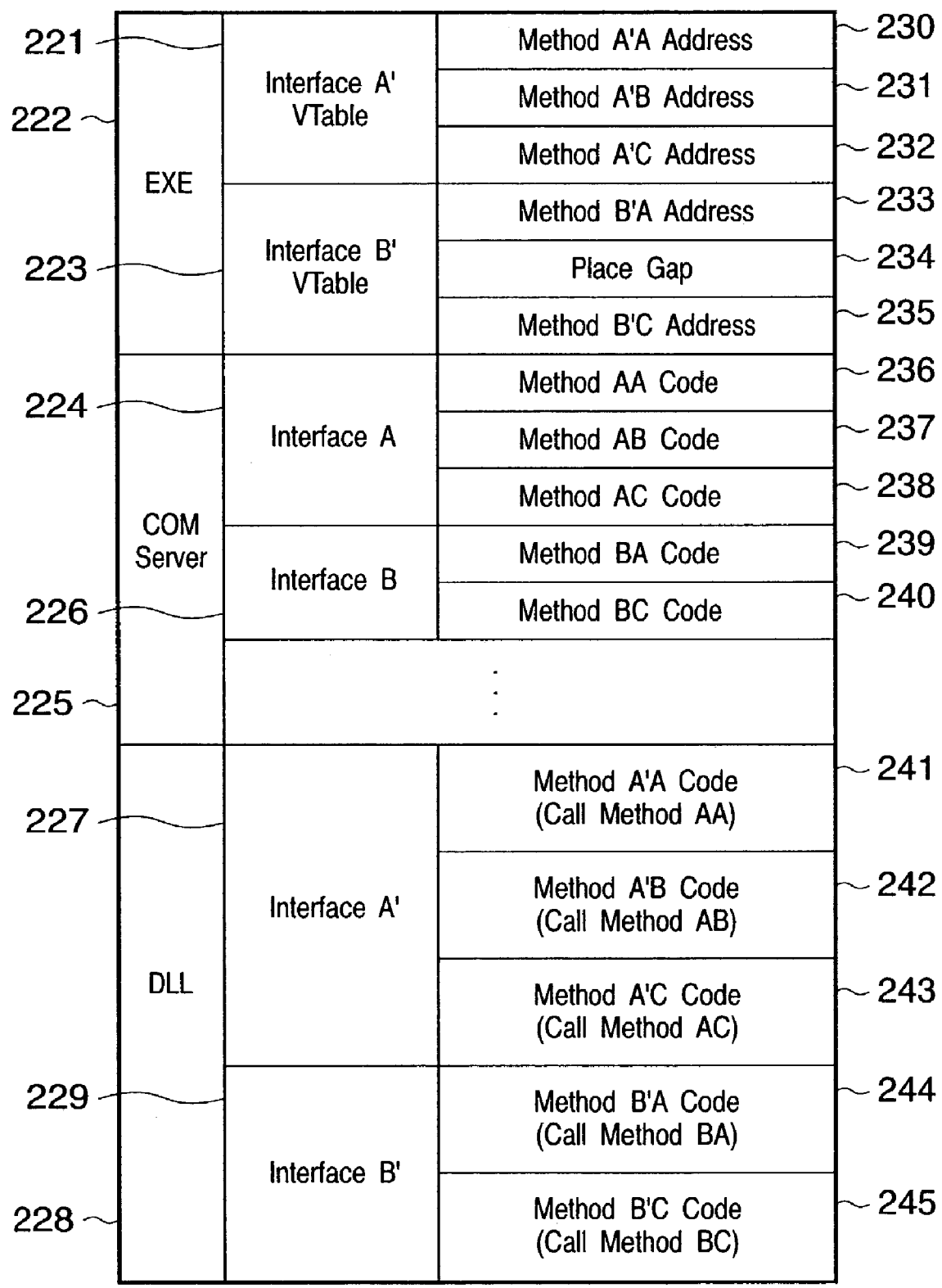
FIG. 13 shows how log acquisition codes are stored in the memory acquisition method according to the second embodiment.

FIG. 13 shows how log acquisition codes are stored in memory when a virtual address table contains a place gap in the software evaluation system according to the second embodiment. The second embodiment is best illustrated in FIG. 13, which will be described below in comparison with FIG. 7.

When log acquisition is started, a DLL (228) for VTable Patch is loaded into memory. The DLL changes the addresses of methods contained in a virtual address table (221, 223) to the addresses (230–233, 235) of Method A'A, Method A'B, Method A'C, Method B'A, and Method B'C, which are log acquisition codes in the DLL. The example shown in FIG. 13 differs from the one shown in FIG. 7 in that a place gap (234) is automatically detected and is not changed and the Method B'B code is not placed in the memory. Method A'A, Method A'B, Method A'C, Method B'A, and Method B'C codes (241–245) in the DLL record logs and call their associated methods, Method AA, Method AB, Method AC, Method BA, and Method BC (236–240), which are loaded in the memory for original method calls.

Figure 14:
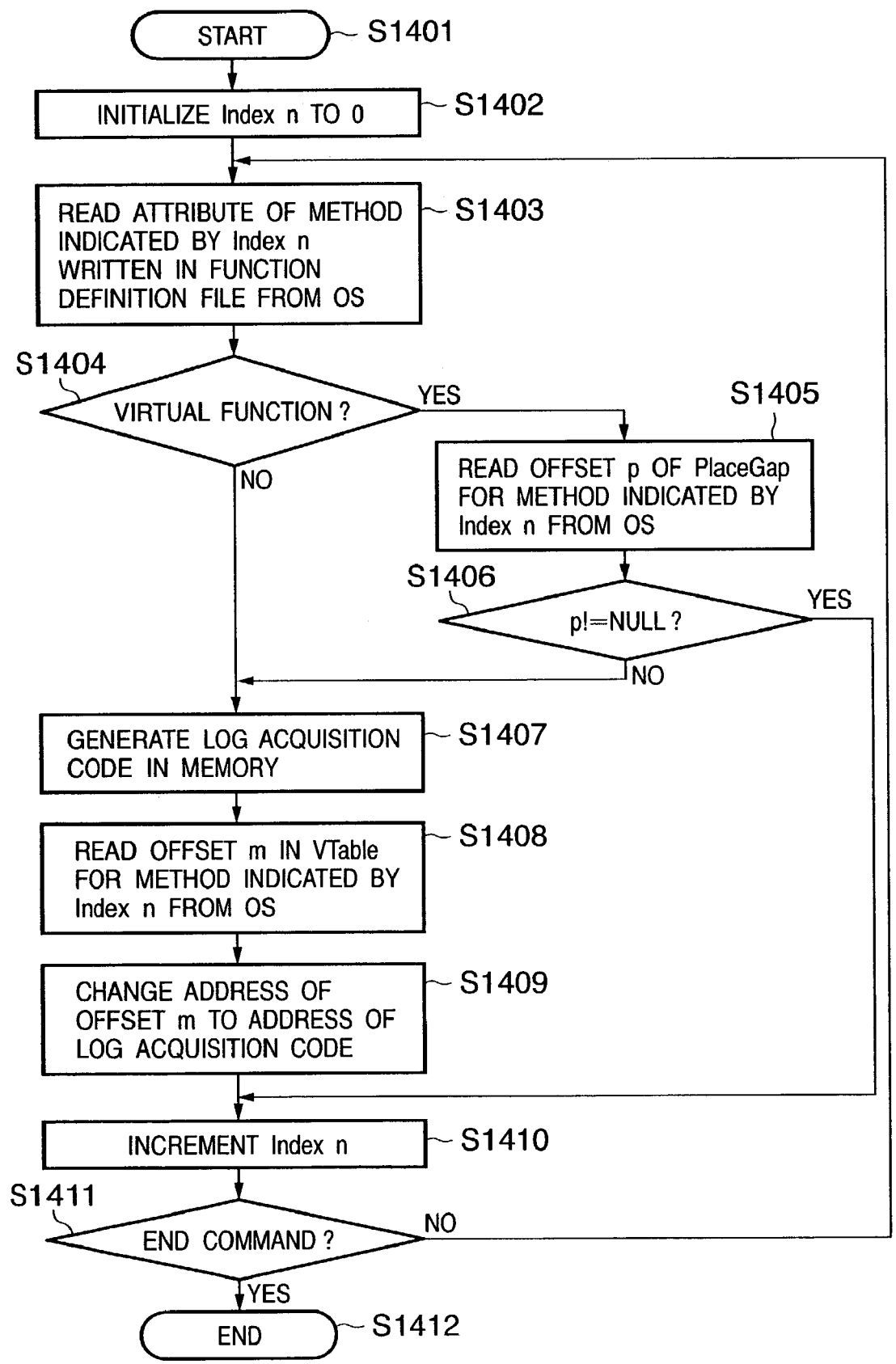
FIG. 14 shows a flowchart of a process according to the second embodiment.

FIG. 14 shows a flowchart of a process performed during a memory load in the software evaluation system according to the second embodiment. FIG. 14, as well as FIG. 13, best illustrates features of the second embodiment.

When the process is started (step S1401), it initializes a memory area to which the process itself refers as an Index to zero (step S1402). The Index indicates the order of methods written in the function definition file. The process then reads the attribute of a method written in the function definition file that is indicated by Index n from the operating system (step S1403) and determines on the basis of the attribute whether or not the function is a virtual function (step S1404). If it is a virtual function, the process reads the offset p of a place gap for the method indicated by Index n from the operating system (OS) (step S1405) and determines whether p is a real value, that is, whether or not it is a null pointer (step S1406). While whether or not there is a place gap is determined on the basis of whether or not p is a real value in this example, it may be determined on the basis of whether or not p is a predetermined value, 0xFFFFFFFF for example, if the operating system defines that the value 0xFFFFFFFF indicates that there is no place gap.

On the other hand, if there is no place gap or it is determined at step S1404 that it is not a virtual function, a log acquisition code is generated as shown in FIG. 7. In particular, the log acquisition code is stored in memory (step S1407), an offset m in the VTable that corresponds to the method indicated by the Index n is read from the operating system (step S1408), and the address of the offset m is changed to the address of the log acquisition code at step S1409.

After the completion of step S1409, or if it is determined at step S1406 that there is a place gap, Index n is incremented (step S1410). This means that the address of the place gap area in the memory is not changed to the address of the log acquisition code. This process is repeated until the memory load ends (step S1411).

FIG. 15 shows an example of a function definition file that specifies the formats of the parameter and return value of each function/method to the software evaluation system according to the second embodiment.

Definitions of place gaps are typically provided by operating systems and therefore are not contained in the function definition file. Accordingly, the function definition file shown in FIG. 15 is the same as the one shown in FIG. 10.

FIG. 16 shows an example of logs acquired for the interface having a place gap shown in FIG. 12 through the use of the function definition file shown in FIG. 15 in the software evaluation system according to the second embodiment. For each call, the time at which the function/method has been called and its parameter and return value are generated as a log. Even though there is a gap in the VTable, the log of the call to Method BC that follows the place gap has been able to be acquired. This is because the flow shown in FIG. 14, namely the process of the second embodiment has, been performed. Unless the place gap detection is performed, the log of the method such as Method BC that follows a place gap cannot be acquired.

As can be seen from the forgoing description, even if a virtual address table contains a place gap, the log can be acquired by automatically finding the place gap on the basis of information returned from the operating system according to the second embodiment.

Third Embodiment

Place gaps are typically used for resolving a virtual function associated with derivation of a class as described with respect to the second embodiment. They may be used for other purposes as well.

Figure 17:
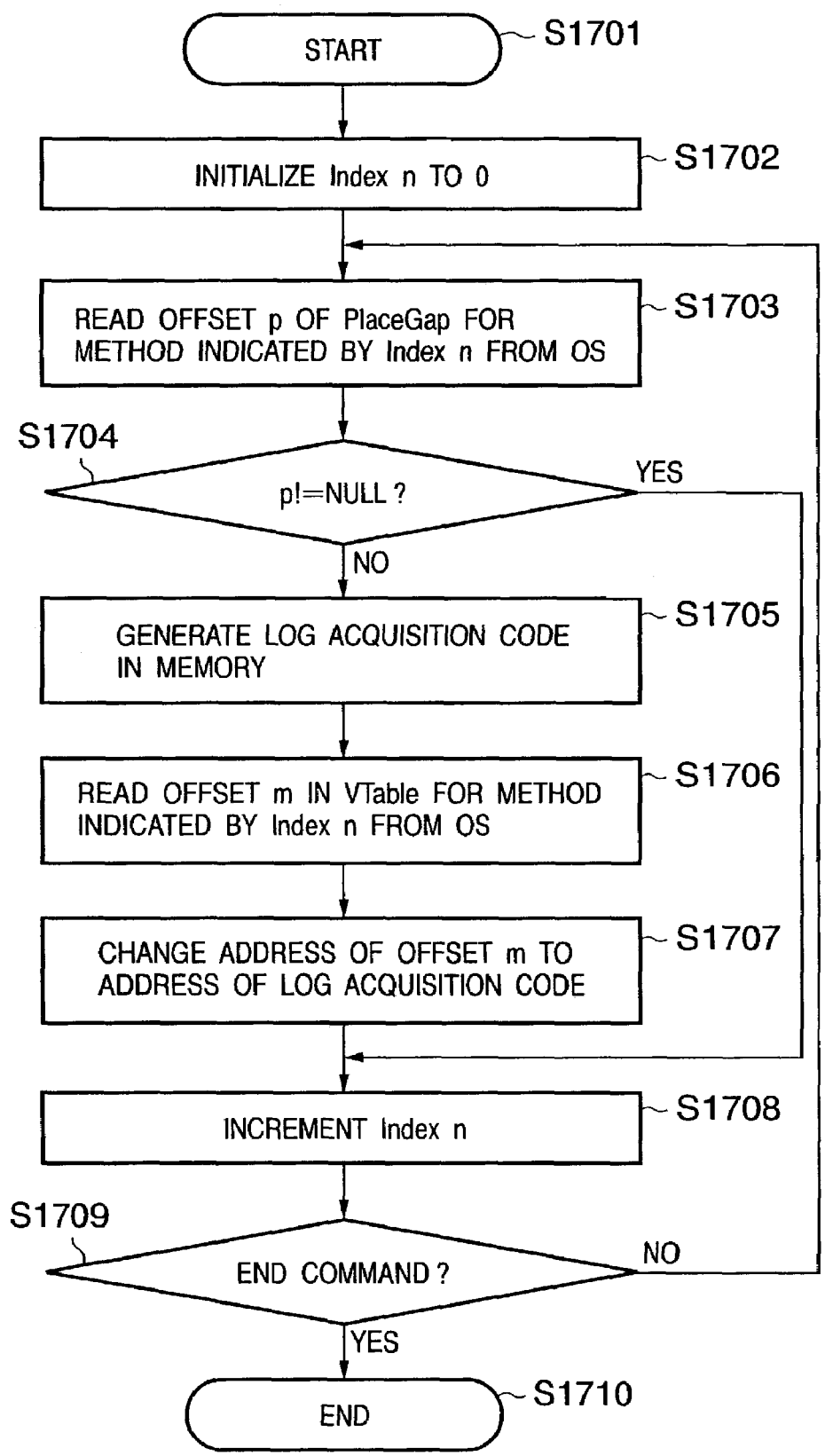
FIG. 17 shows a flowchart of a process for loading data into memory according to a third embodiment.

FIG. 17 shows a flowchart of a process performed during a memory load in the software evaluation system implementing a log acquisition method according to a third embodiment of the present invention. This process differs from the example shown in FIG. 14.

When the process is started (step S1701), it initializes a memory area to which the process itself refers as an Index to zero (step S11702). The Index indicates the order of methods written in the function definition file. The process then reads the offset p of a place gap for the method indicated by Index n from the operating system (step S1703) and determines whether or not p is a real value. That is, it determines whether p is a null pointer (step S1704). While a determination is made as to whether or not there is a place gap on the basis of whether or not p is a real value in this example, it may be determined on the basis of whether or not p is a predetermined value, 0xFFFFFFFF for example, if the operating system defines that the value 0xFFFFFFFF indicates that there is no place gap.

On the other hand, if there is no place gap, a log acquisition code is generated as shown in FIG. 7. In particular, the log acquisition code is stored in memory (step S1705), an offset m in the VTable that corresponds to the method indicated by the Index n is read from the operating system (step S1706), and the address of the offset m is changed to the address of the log acquisition code (step S1707).

After the completion of step S1707, or if it is determined at step S1704 that there is a place gap, Index n is incremented (step S11708). This means that the address of the place gap area in the memory is not changed to the address of the log acquisition code. This process is repeated until the memory load ends (step S1709).

This process enables logging of a call to the method following a place gap as shown in FIG. 16 that is used for some other purpose than resolving a virtual function.

Fourth Embodiment

A fourth embodiment will be described with respect to a process performed when an instance of an interface is generated within a method.

In the fourth embodiment, parameters and return values are checked during every method call to determine whether or not the parameters or return values are those associated with interfaces to be logged. If so, a log acquisition code is separately loaded into memory and the parameters or return values are changed and the function is returned to the address of the log acquisition code so that the log of the call to a method within an instance of the interface that is generated within the method can be automatically recorded. This process will be described below in detail.

FIG. 18 shows an example of a function definition file that specifies the formats of the parameter and return value of each function/method to the software evaluation system according to the fourth embodiment. DLL names and function/method names are described and the type of the parameters and return values of the functions/methods are indicated. The software evaluation system according to the fourth embodiment determines on the basis of the specifications in the function definition file what kind of parameter and return value each function/method has, and then acquires the data as a log. In the present embodiment, Method AB of Interface A returns as an output parameter the pointer to an instance of Interface B that is generated within Method AB. Method AC of Interface A returns as a return value the pointer to an instance of Interface B that is generated within Method AB. In order for an EXE to call a method within Interface B that is described as a code in DLL, the EXE must first use Method AB or Method AC to generate an instance of Interface B and know the memory address of that instance.

FIG. 19 shows examples of logs acquired through the use of the function definition file shown in FIG. 18. For each call, the time at which the function/method was called and its parameter and return value are generated as a log.

Figure 20:
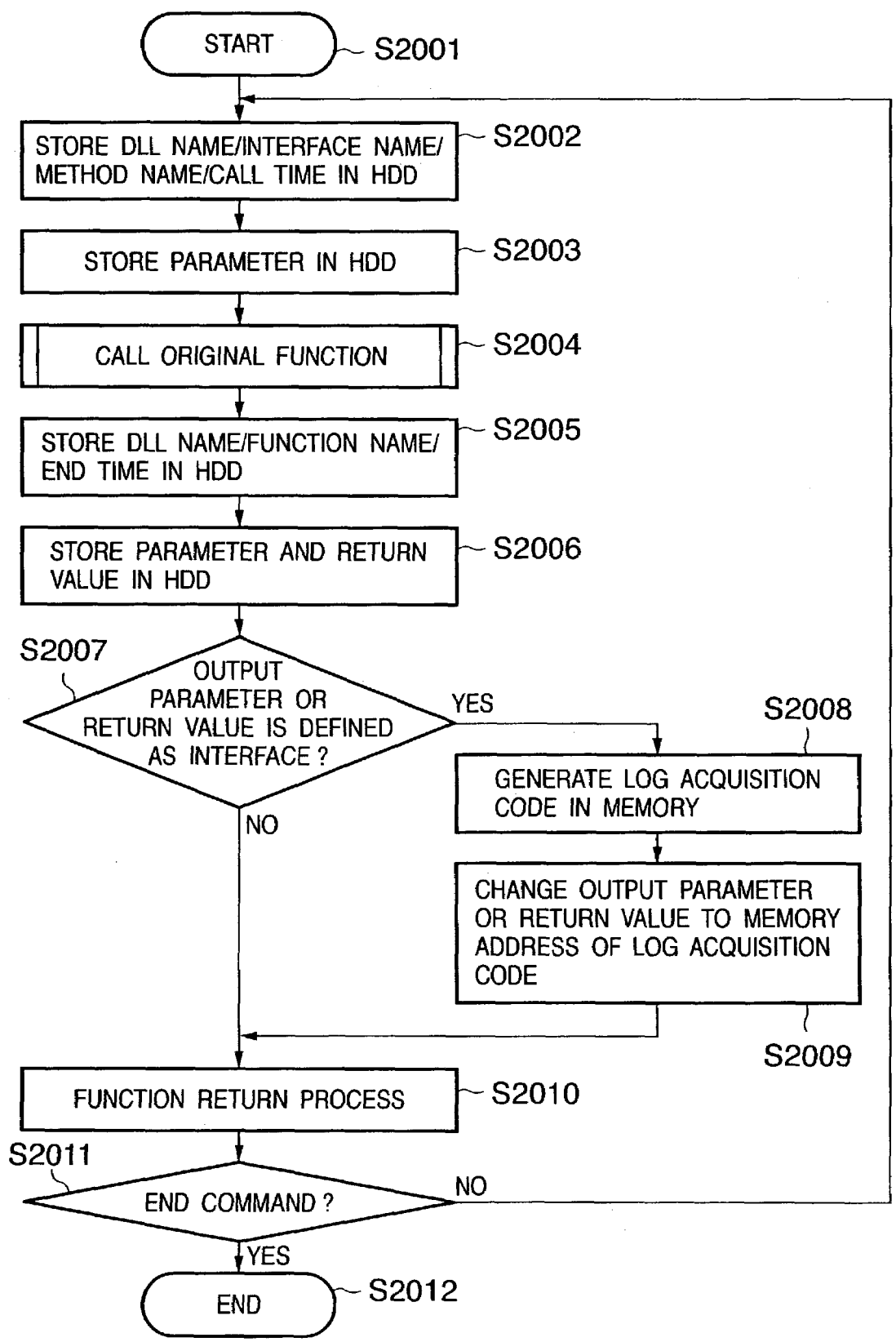
FIG. 20 shows a flowchart of a process according to the fourth embodiment.

FIG. 20 shows a flowchart of a process according to the fourth embodiment.

The process is started at step S2001. Each time a set function/method is called, the DLL name/interface name/method name/call time are stored in the HDD (step S2002), the parameter for the call is stored in the HDD (step S2003), and the method is called (step S2004).

After the completion of the process in the method, the DLL name, interface name, method name, and end time are stored in the HDD (step S2005) and the parameter and return value for the call are stored in the HDD (step S2006).

Then it is determined from the function definition file shown in FIG. 18 whether the parameter or return value is defined as the pointer to an interface (step S2007). If so, a log acquisition code for that pointer is generated in memory (step S2008) and the parameter or return value is changed to the memory address of the log acquisition code (step S2009). When step S2009 ends or it is determined at step S2007 that no pointer is defined, a function return is performed (step S2010).

The process described above is repeated until the program being evaluated is ended (step S2011).

Thus, the pointer to the instance of the interface returned by the method as a parameter or return value to the EXE can be redirected to the log acquisition code and thereby the parameter, return value, and times for a call to a method, such as Method BA of Interface B shown in FIG. 18, for example, that is called through the use of that pointer can be recorded as shown in FIG. 19.

Fifth Embodiment

Figure 21:
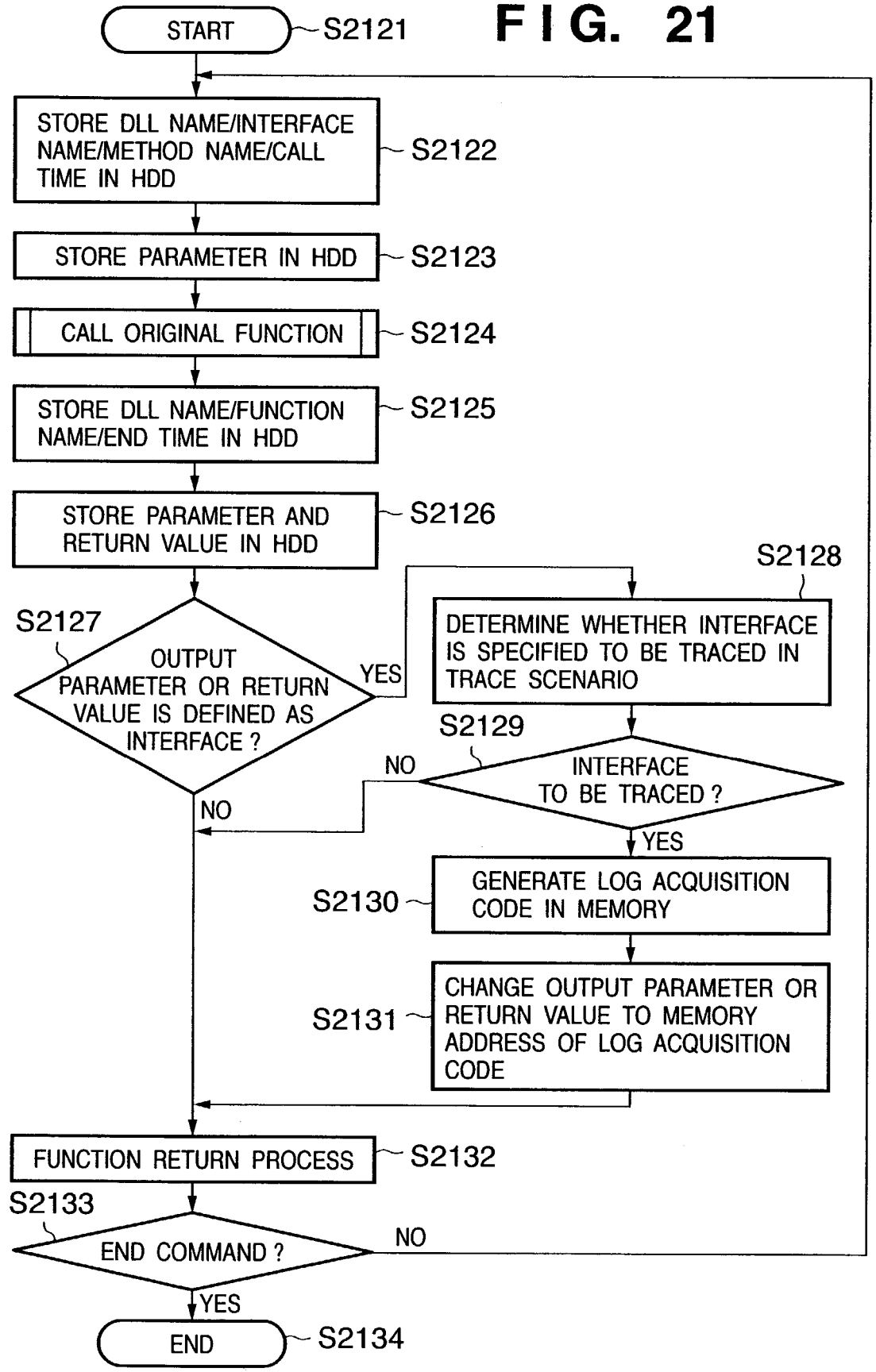
FIG. 21 shows a flowchart of a process according to the fifth embodiment.

FIG. 21 shows a flowchart of a process according to a fifth embodiment. The process differs from the fourth embodiment shown in FIG. 20 in having additional steps S2128 to S2129.

That is, if it is determined that the parameter or return value is defined as the pointer to an interface, it is determined whether or not the interface is to be traced (logged), which is specified in a trace scenario (steps S2128 and S2129). If the determination is positive, a log acquisition code for the pointer is generated on memory (step S2130) and the parameter or return value is changed to the address of the log acquisition code (step S2131). When the process in step S2131 ends or the determination at step S2127 is that it is not defined as an interface pointer or the determination at step S2129 is negative, a function return is performed (step S2132).

The process described above is repeated until the program being evaluated is ended (step S2133).

Unlike the fourth embodiment, the fifth embodiment generates a log acquisition code and redirects an address only if a parameter or return value is to be traced. Accordingly, memory usage can be reduced and reduction in speed of processing an EXE and DLL of which the log is acquired can be avoided.

Sixth Embodiment

A sixth embodiment will be described with respect to a process performed through the use of a function definition file that differs from the one used in the embodiments described above.

FIG. 22 shows an example of a function definition file that specifies the formats of the parameter and return value of each function/method to the software evaluation system according to the sixth embodiment.

The number of bytes of Packing Option shown in FIG. 22 is a definition unique to the present embodiment.

FIG. 23 shows an example of logs acquired in the software evaluation system according to the sixth embodiment through the use of the function definition file shown in FIG. 22. For each call, the time at which the function/method has been called and its parameter and return value are generated as a log.

Before the description of FIG. 24, the structure packing option, which has been widely used, will be described.

The structure packing option is a rule concerning how structures should be aligned in memory. They are used when a structure is passed from one module to another.

In a typical CPU, the members of a structure are arranged in memory in such a manner that they are read into registers without reducing the speed of the CPU. In a CPU having a data bus width of 64 bits, for example, members can be aligned on memory boundaries as shown below so that data in the memory can be read to registers without reducing the speed of the CPU:

1 byte data .fwdarw.0x0000000, 0x00000001, 0x00000002, . . .
2 bytes data .fwdarw.0x00000000, 0x00000002, 0x00000004, . . . (least 1 bit is zero)
4 bytes data .fwdarw.0x00000000, 0x00000004, 0x00000088, . . . (least 2 bits are zero)
8 bytes data .fwdarw.0x00000000, 0x00000008, 0x0000000, . . . . (least 3 bits are zero)

This depends on the characteristic of typical CPUs that reading data from memory addresses divisible by data size is faster than reading from memory the other addresses when calculating memory addresses.

Arranging data in this manner can optimize the speed but has the adverse effect of leaving a large amount of unused space in the memory.

In order to avoid this adverse effect, a structure-packing option is provided for compilers in general. One may prefer reducing memory usage to the speed when calculation on 8-byte data is performed and prefer the speed to memory usage reduction when calculation on 4 bytes or less of data, for example. In such a case, programs (both of EXE and DLL in this embodiment) can be compiled with the structure packing option set to 4-byte-alignment to allow the members of the structure to be aligned on memory boundaries as shown below:

1 byte data .fwdarw.0x00000000, 0x00000001, 0x00000002, . . .
2 bytes data .fwdarw.0x00000000, 0x00000002, 0x00000004, . . . (least 1 bit is zero)
4 bytes data .fwdarw.0x00000000, 0x00000004, 0x00000008, . . . (least 2 bits are zero)
8 bytes data .fwdarw.0x00000000, 0x00000004, 0x00000008, . . . (least 2 bits are zero)

In this case, only data smaller than or equal to 4 bytes are placed at memory addresses divisible by data sizes.

If one wants to place only data not greater than 1 byte in memory addresses divisibly by the data size, the programs can be compiled with the structure packing option set to 1 to allow the members of the structure on memory boundaries as shown below:

1 byte data .fwdarw.0x00000000, 0x00000001, 0x00000002, . . .
2 bytes data .fwdarw.0x00000000, 0x00000002, 0x00000004, . . . (least 1 bit is zero)
4 bytes data .fwdarw.0x00000000, 0x00000002, 0x00000004, . . . (least 2 bits are zero)
8 bytes data .fwdarw.0x00000000, 0x00000002, 0x00000004, . . . (least 2 bits are zero)

If one wants to place only data not greater than 2 bytes in memory addresses divisibly by the data size, the programs can be compiled with the structure-packing option set to 2 to allow the members of the structure on memory boundaries as shown below:

1 byte data .fwdarw.0x00000000, 0x00000001, 0x00000002, . . .
2 bytes data .fwdarw.0x000000, 0x00000001, 0x00000002, . . .
4 bytes data .fwdarw.0x00000000, 0x00000001, 0x00000002, . . . .
8 bytes data .fwdarw.0x00000000, 0x00000001, 0x00000002, . . . .

FIG. 24 more specifically shows an example of the structure packing option described above. If the members of a structure are 1-byte data and 8-byte data, then the structure passed between EXE and DLL as a parameter or return value is arranged in memory as shown in FIG. 24 according to the packing option of the structure.

FIG. 25 shows another example of the structure packing option. If the members of a structure are 1-byte data and 4-byte data, then the structure passed between EXE and DLL as a parameter or return value is arranged in memory as shown in FIG. 25 according to the packing option of the structure.

FIG. 26 shows another example of the structure packing option. If the members of a structure are 1-byte data and 2-byte data, then the structure passed between EXE and DLL as a parameter or return value is arranged in memory as shown in FIG. 25 according to the packing option of the structure.

These are provided only by way of example for illustrating the structure packing option. The advantages of the present invention are available irrespective of what type of structure packing option is used. The present invention is characterized in that the content of a structure included in a parameter or return value of a function/method being traced is automatically extracted according to a structure packing option specified in the function definition file.

Figure 27:
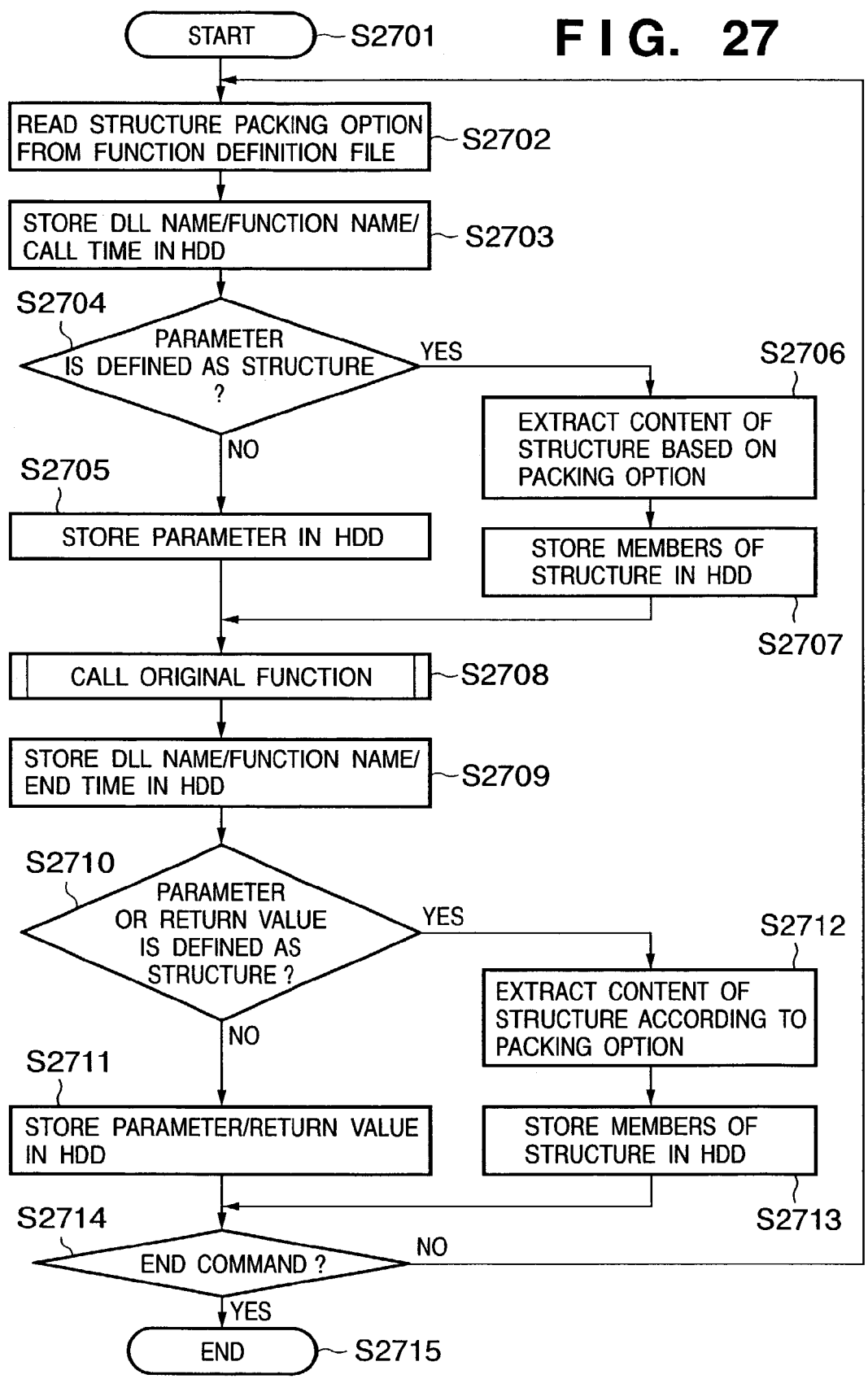
FIG. 27 shows a flowchart of a process according to the sixth embodiment.

FIG. 27 shows a flowchart of a process in the software evaluation system according to the sixth embodiment.

When the process is started by calling a set function/method (step S2701), the packing option of the structure is read from the function definition file (step S2702), the DLL name, function name, call time are stored in the HDD (step S2703).

Then it is determined on the basis of the function definition file shown in FIG. 22 whether or not a parameter is defined as a structure (step S2704). If not, the parameter for the call is stored in the HDD (step S2705). If it is defined as a structure, the content of the structure is extracted from the memory according to the structure packing option read at step S2702 (step S2706), and the members of the structure are stored in the HDD (step S2707).

After completion of the process in the function (step S2708), the DLL name, function name, and end time are stored in the HDD (step 82709). Then it is determined from the function definition file shown in FIG. 22 whether or not a parameter or return value is defined as a structure (step S2710). If not, the parameter or return value for the call is stored in the HDD (step S2711). If it is defined as a structure, the content of the structure is extracted from the memory according to the structure packing option read at step S2702 (step S2712), and the parameter or return value for the call is stored in the HDD (step S2713).

This process is repeated until the program being evaluated is ended (step S2714).

As can be seen from the forgoing description, the log acquisition method according to the present invention can reduce memory usage in log acquisition through the use of the packing option in the function definition.

Seventh Embodiment

While the sixth embodiment described above uses the packing option to reduce memory usage in log acquisition, memory usage in log acquisition can also be reduced to a certain value or smaller by limiting the amount of log data being buffered in memory.

FIG. 28 shows an example of function definition file according to a seventh embodiment. DLL name and function/method name are described and the type of parameter and return value for the function/method are indicated. The software evaluation system according to the seventh embodiment determines on the basis of the specifications in the function definition file what kind of parameter or return value each function/method has, and then acquires the data as a log.

FIG. 29 shows an example of logs acquired according to the seventh embodiment through the use of the function definition file shown in FIG. 28. For each call, the time at which the function/method has been called and its parameter and return value are generated as a log.

FIG. 30 shows a memory organization when the log shown in FIG. 29 is stored in the memory. For each function call, data and an Index are stored at memory offsets.

FIG. 31 shows a flowchart of a process according to the seventh embodiment of the present invention.

When the process is started by calling a set function/method (step S3101), a register or memory area specified for Index counting is cleared to zero (step S3102), and the set Index count to be buffered in memory is read (step S3103) Then the Index is stored in the Index area indicated in FIG. 30 (step S3104), the DLL name, function name, call time are stored in the memory (step S3105), the parameter for the call is stored in the memory (step S3106), and the function/method is called (step S3107).

After the completion of the process in the function, the DLL name, function name, and end time are stored in the memory (step S3108) and a parameter and return value for the call are stored in the memory (step S3109) Then the set value read at step S3103 is compared with the current Index (step S3110). If the set value is greater than or equal to the current Index, the log data is not transferred to the HDD but the Index count is incremented (step S3111) and the process returns to step S3104. On the other hand, if the Index is greater than the set value, the data stored in the memory is transferred to the HDD and the data in the memory is cleared to zero (step S3112).

The process is repeated until the program being evaluated is ended (step S3113).

Eighth Embodiment

While Index counting is performed to limit memory usage in log acquisition to a certain value or smaller in the seventh embodiment described above, memory usage can be limited by limiting the size of log data.

FIG. 32 shows a flowchart of a process according to an eighth embodiment. The process differs from the seventh embodiment because steps S3203, S3210, and S3212 replace steps S3103, S3110, and S3112. That is, a log size setting to be buffered in memory is read (step S3203).

The set value read at step S3203 is compared with the size of the data stored in the memory up to the current Index (step S3210). If the size of data stored in the memory is greater than the set size, a portion of the data in the memory up to the previous Index is transferred to the HDD and the data up to the previous Index in the memory is cleared to zero (step S3212). Transferring the data up to the previous index from the memory to the HDD can kept memory usage from exceeding the specified size.

Ninth Embodiment

FIG. 33 shows an example of a user interface for setting features described with respect to the seventh and eighth embodiments of the present invention. By checking the check box, whether log data is stored in buffer can be specified, and if doing so, a choice of specification is allowed in number of records, that is, by Index in the seventh embodiment, or in size as described with respect to the eighth embodiment.

Tenth Embodiment

While reduction in memory usage in log acquisition has been described with respect to the embodiments described above, the amount of data in a log file to be stored in the HDD can also be reduced.

FIG. 34 shows an example of function definition file according to a tenth embodiment. The DLL name and function/method name are described and the type of parameter and return value for the function/method are indicated. The software evaluation system according to the tenth embodiment determines on the basis of the specifications in the function definition file whether what kind of parameter/return value each function/method has, and then acquires the data as a log.

The function definition of a function FuncAB in A.DLL shown in FIG. 34 best illustrates the tenth embodiment. The pointer pBuf indicated as the storage location of data and the size of that data, dwBufSize are defined in its argument. The correlation between pBuf and dwBufSize is defined. That is, the correlation that the size of data stored in pBuf is indicated by dwBufSize is defined.

FIG. 35 shows an example of logs acquired through the use of the function definition file shown in FIG. 34. For each call, the time at which the function/method is called and a parameter and return value for the call are generated as a log.

Besides the function definition file shown in FIG. 34, the log of the call to a function FuncAB in A.DLL shown in FIG. 35 best illustrates features of the tenth embodiment. When FuncAB is called on the basis of the function definition shown in FIG. 34, not only the value of the argument pBuf but also dwBufSize, namely 24 bytes, of data at the address pointed to by the value is stored as a separate, binary log which differs from an ordinary log. The ID of the call to the FuncAB, namely the Data ID, which is stored in the binary log file is stored in the ordinary log as additional information.

FIG. 36 shows an example of the content of the binary log file stored along with the log shown in FIG. 35. Data IDs are stored as tags and binary data is stored under each Data ID.

The embodiment described with respect to the function definition file, log, and binary log shown in FIGS. 34 to 36 is effective whether the data indicated is input or output data or a return value. For example, when a data address is returned as an output parameter from a function and the size of data is outputted as a return value from the function, the log of the data can be acquired.

Figure 37:
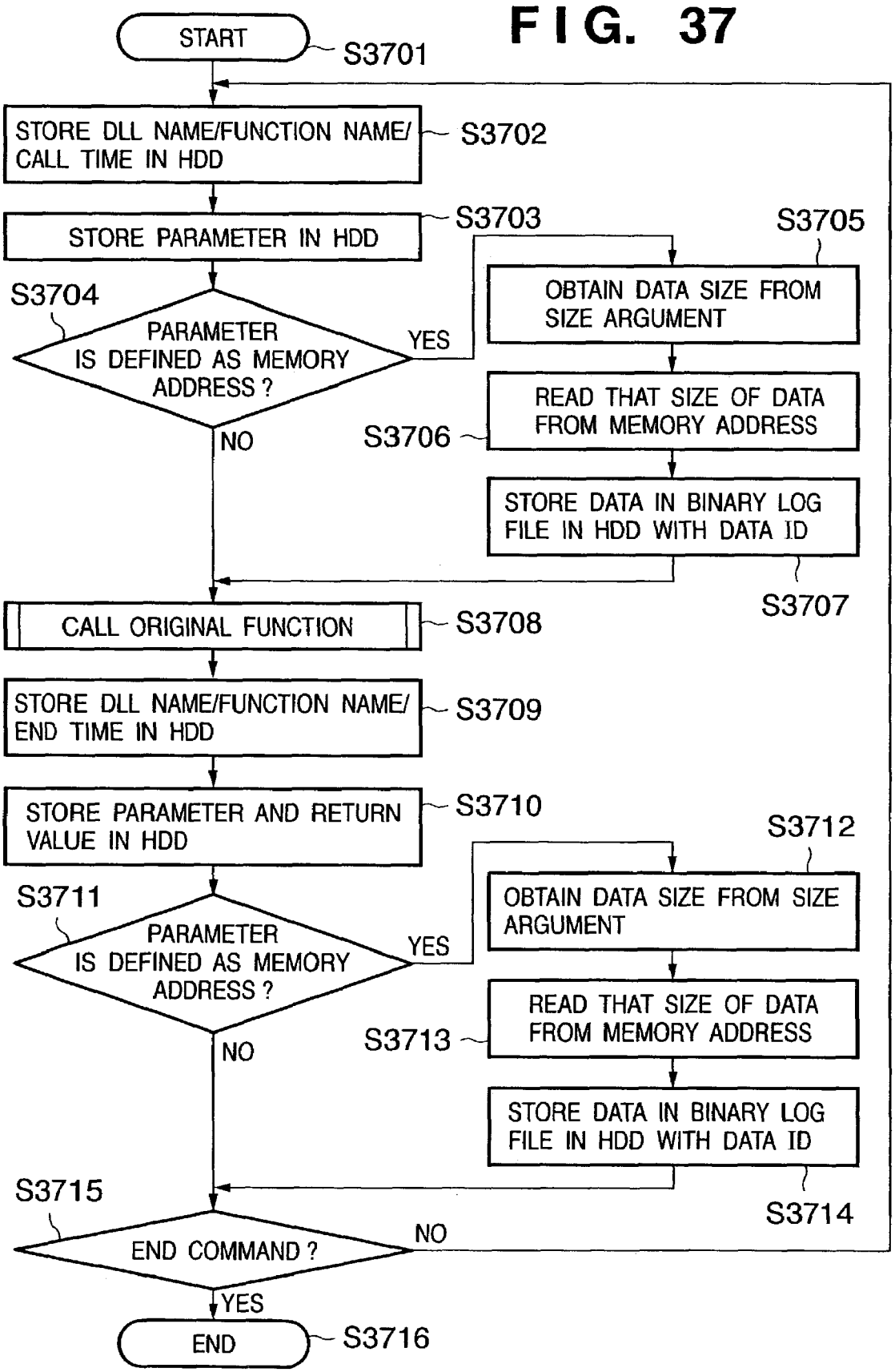
FIG. 37 shows a flowchart of a process according to the tenth embodiment.

FIG. 37 shows a flowchart of a process according to the tenth embodiment.

When the process is started by calling a set function/method (step S3701), the DLL name, function name, and call time are stored in the HDD (step S3702) and the parameter for the call is stored in the HDD (step S3703).

Then it is determined from the function definition file shown in FIG. 34 whether or not the parameter is defined as a memory address (step S3704). If it is defined as a memory address, the data size is obtained from an argument indicating size (step S3705), that size of data is read from memory (step S3706), and the data is stored in a binary log file in the HDD along with its Data ID (step S3707). On the other hand, if the parameter is not defined as a memory address, steps S3705 to S3707 are not performed.

After the completion of the process in the function (step S3708), the DLL name, function name, and end time are stored in the HDD (step S3709) and the parameter and return value for the call are stored in the HDD (step S3710).

Then it is determined from the function definition file shown in FIG. 34 whether or not the parameter is defined as a memory address (step S3711). If it is defined as a memory address, the data size is obtained from an argument indicating size (step S3712), that size of data is read from the memory (step S3713), and the data is stored in the binary log file in the HDD along with its Data ID (step S3714). On the other hand, if the parameter is not defined as a memory address, steps S3712 to S3714 are not performed.

The process is repeated until the program being evaluated is ended (step S3715).

As can be seen from the forgoing description, if the parameter is defined as a memory address in the function definition file and binary data corresponding to the memory address is stored as log file, the amount of log file data to be stored in the HDD can be reduced by storing only binary data of size defined in the function definition file as log file.

Eleventh Embodiment

While binary parameter (binary data stored at a memory address defined as its parameter) of the size obtained from the size argument is stored in the tenth embodiment, the size of data being stored can be controlled to within a specified limit.

Figure 38:
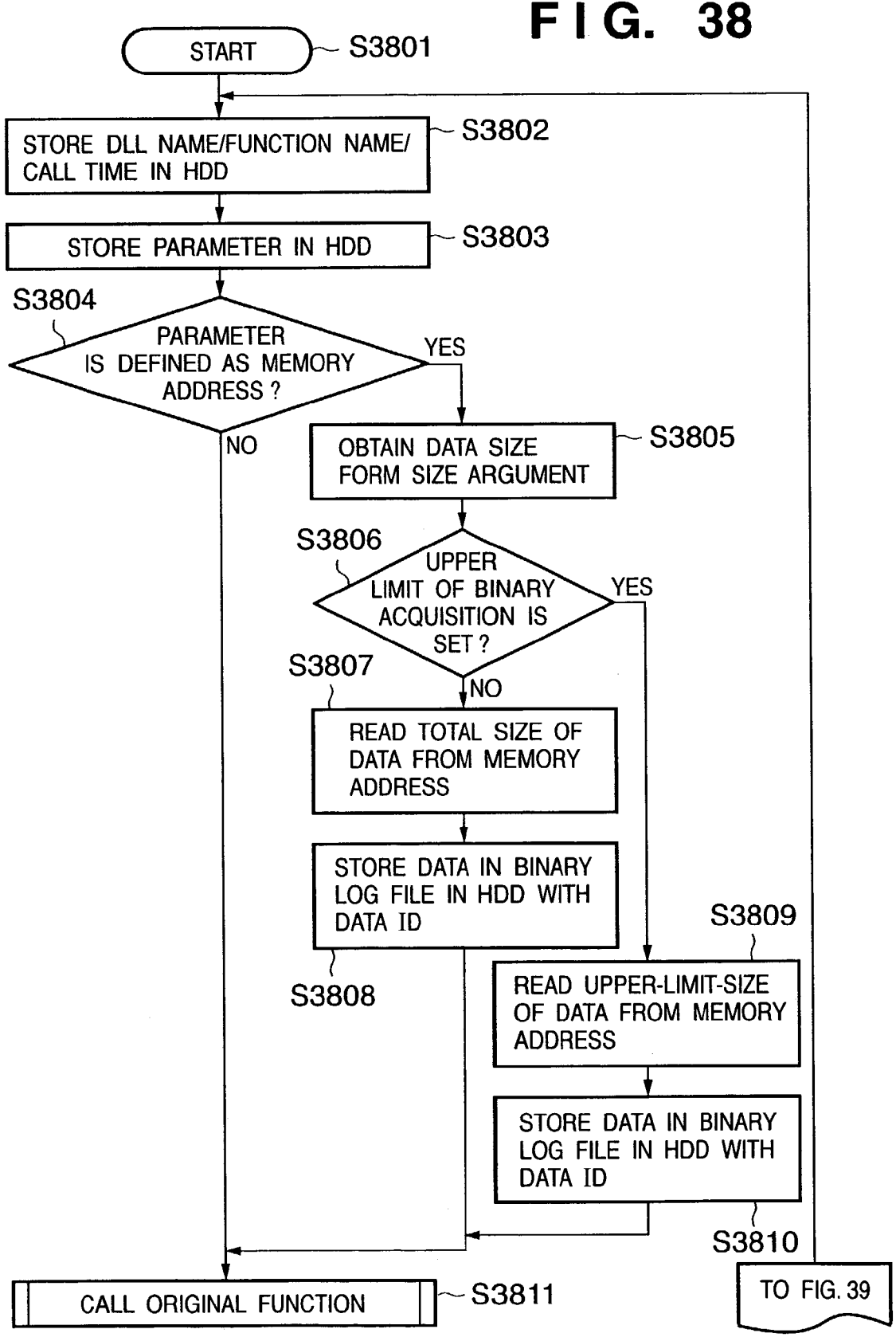
FIG. 38 shows a flowchart of a process according to an eleventh embodiment.
Figure 39:
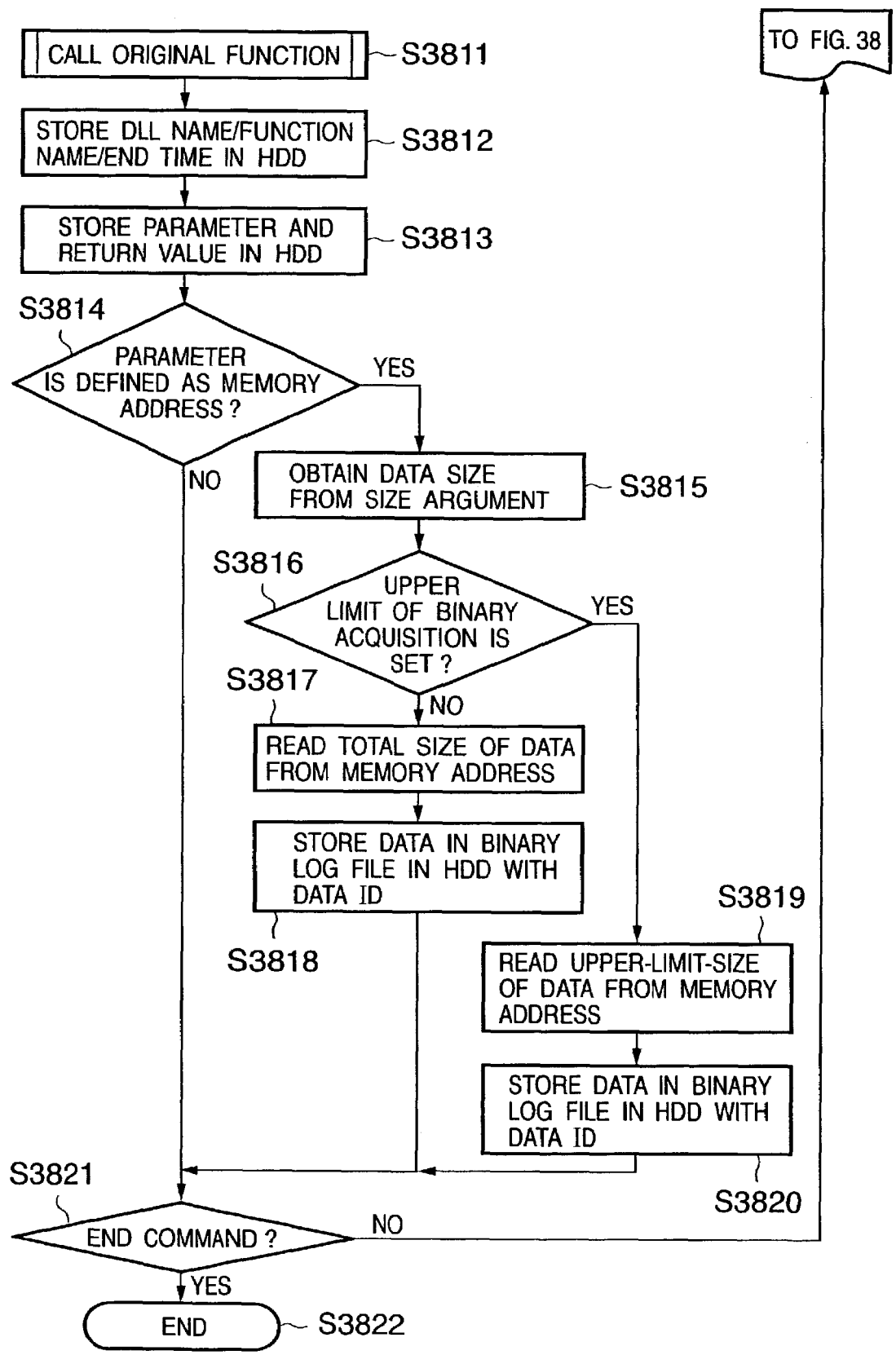
FIG. 39 shows a flowchart of a process according to the eleventh embodiment.

FIGS. 38 and 39 show a flowchart of a process according to an eleventh embodiment.

Steps S3801 to S3805 are performed in the same way as steps S3701 to S3705 described above. Then it is determined whether or not the upper limit of binary data being acquired is set (step S3806). If no upper limit is set, the total size of data indicated in a size argument is read from the memory (step S3807) and the data is stored in a binary log file in the HDD along with its Data ID (step S3808). On the other hand, if an upper limit is set, then data equal in size to the upper limit is read from the memory (step S3809) and the data is stored in the binary log file in the HDD along with its Data ID (step S3810). If the parameter is not specified as a memory address, steps S3805 to S3810 are not performed.

Steps S3811 to S3815 are performed in the same way as steps S3708 to S3712 described above. Further, steps S3816 to S3820 are performed in the same way as steps S3806 to S3810.

The process described above is repeated until the program being evaluated is ended (step S3821).

Twelfth Embodiment

FIG. 40 shows an example of a user interface for setting features described with respect to the tenth and eleventh embodiments. There are provided logging options of storing input parameters, output parameters, and binary parameters, respectively. If the option of storing binary parameters is selected, the process described with respect to the tenth embodiment is performed. If the option of storing binary parameters is selected and the option of keeping stored data from exceeding a specified size is selected and the size is specified, the process described with respect to the eleventh embodiment is performed.

Thirteenth Embodiment

FIG. 41 shows a user interface for associating a Data ID described in a basic log shown in FIG. 34 and the Data ID data in the binary log shown in FIG. 35. This user interface allows the data associated with the Data ID to be readily referred to. Indication that a parameter is a memory address parameter is presented on the display of an ordinary log and, when a user selects the indication by means of a mouse or the like, the data associated with the Data ID is displayed.

Other Embodiments

The present invention may be applied to a system consisting of a plurality of devices (for example, a host computer, interface devices, a reader, and a printer) or a standalone apparatus (for example a copying machine or facsimile machine.

The object of the present invention can also be achieved by providing a storage medium containing a program code of software that implements the functions of the embodiments described above to a system or an apparatus and causes to a computer (or CPU or MPU) of the system or the apparatus to read and execute the program code stored on the storage medium.

In that case, the program code read from the storage medium implements the functions of the embodiments described above and the storage medium on which the program code is stored constitutes the present invention.

The storage medium for providing the program code may be a floppy® disk, disk, hard disk, optical disk, magneto-optical disk, CD-ROM, CD-R, magnetic tape, nonvolatile memory card, or ROM.

The present invention includes not only implementations in which the features of the embodiments described above are implemented by a computer reading and executing the program code but also implementations in which an OS (operating system) or the like running on a computer executes all or part of the actual processing to implement the features of the embodiments described above according to instructions in the program code.

Furthermore, the present invention includes cases where the program code read from the storage medium is written into an expansion board inserted into a computer or memory provided in a expansion unit connected to a computer and a CPU or other processor provided in the expansion board or expansion unit executes all or part of the actual processing and the processing implements the features of the embodiments described above.

As described above, the present invention allows processing logs of software divided into a plurality of modules to be readily acquired and reduces the man-hours need to analyze the cause of software failure.

As many apparently widely different embodiments of the present invention can be made without departing from the spirit and scope thereof, it is to be understood that the invention is not limited to the specific embodiments thereof except as defined in the appended claims.

What is claimed is:

1. A log acquisition method for acquiring a runtime log of a program including a function for performing a predetermined process, comprising the step of:

changing the address of said function loaded for performing said predetermined process to the address of a function for log acquisition,
wherein said function for log acquisition comprises the steps of:
calling said function for performing said predetermined process to cause said predetermined process to be executed, receiving the result of the execution, and passing said result to said program;
recording given information when calling said function for performing said predetermined process; and
recording given information when receiving said result of the execution.

2. The log acquisition method according to claim 1, wherein said given information recorded when calling said function for performing said predetermined process includes at least one of the function name of the function called, the time at which said function is called, a memory content pointed to by a parameter specified when calling said function, or a pointer parameter specified when calling said function.

3. The log acquisition method according to claim 1, wherein said given information recorded when receiving said result of the execution includes at least one of the time at which said result is received, a parameter received, a return value received, and a memory content pointed to by a pointer parameter received.

4. The log acquisition method according to claim 1, wherein the address of said function for performing said predetermined process is listed in an import function address table by dynamic link library, said dynamic link library providing the method.

5. The log acquisition method according to claim 1, further comprising the step of selecting an address to be changed to the address of said function for log acquisition from among the addresses of said functions for performing predetermined processes,
wherein in said changing step, the address selected in said selecting step is changed to the address of the function for log acquisition.

6. A storage medium storing a control program for causing a computer to implement the log acquisition method according to claim 1.

7. A control program, stored, in executable form, in a computer-readable storage medium, for causing a program to implement the log acquisition method according to claim 1.

8. A computer-implemented log acquisition method for acquiring a runtime log of a program including a method for performing a predetermined process, comprising the step of:
changing the address of said method loaded for performing said predetermined process to the address of a method for log acquisition,
wherein said method for log acquisition comprises the steps of:
calling said method for performing said predetermined process to cause said predetermined process to be executed, receiving the result of the execution, and passing said result to said program;
recording given information when calling said method for performing said predetermined process; and
recording given information when receiving said result of the execution.

9. The log acquisition method according to claim 8, wherein said given information recorded when calling said method for performing said predetermined process includes at least one of the method name of the method called, the time at which said method is called, a memory content pointed to by a parameter specified when calling said method, or a pointer parameter specified when calling said method.

10. The log acquisition method according to claim 8, wherein said given information recorded when receiving said result of the execution includes at least one of the time at which said result is received, a parameter received, a return value received, and a memory content pointed to by a pointer parameter received.

11. The log acquisition method according to claim 8, wherein the address of said method for performing said predetermined process is listed in a virtual address table by interface, said interface providing the method.

12. A storage medium storing a control program for causing a computer to implement the log acquisition method according to claim 8.

13. A control program, stored, in executable form, in a computer-readable storage medium, for causing a program to implement the log acquisition method according to claim 8.

14. The log acquisition method according to claim 8, further comprising the step of selecting an address to be changed to the address of said method for log acquisition from among the addresses of said methods for performing predetermined processes,
wherein in said changing step the address selected in said selecting step is changed to the address of the function for log acquisition.

15. The log acquisition method according to claim 11, further comprising the steps of determining whether or not said virtual address table contains a place gap; and
if said virtual address table contains a place gap, obtaining the offset of said place gap from an operating system,
wherein said step of changing the address does not change the area of said place gap associated with the offset obtained by said obtaining step to the address of said method for log acquisition.

16. A log acquisition method for obtaining a runtime log of a program including a function for performing a predetermined process, comprising the step of:
changing the address of said function loaded for performing said predetermined process to the address of a function for log acquisition,
wherein said function for log acquisition comprises the steps of:
calling said function for performing said predetermined process to cause said process to be executed, receiving the result of the execution, and passing said result to said program;
determining whether or not a parameter or return value is defined as a structure in a function definition in said program;
if a parameter or return value is defined as a structure, placing the content of said structure in memory on the basis of a packing option of said structure; and
recording the content of said structure placed in said memory as a log in a disk device.

17. A storing medium storing a control program for causing a computer to implement the log acquisition method according to claim 16.

18. A control program, stored, in executable form, in a computer-readable storage medium, for causing a computer to implement the log acquisition method according to claim 16.

19. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, receiving the result of the execution, and passing said result to said program;

storing given information when calling said function for performing said predetermined process and given information when receiving said result of the execution as a log in memory;

specifying the number of calls to the function for performing said predetermined process; and after said given information associated with said specified number of calls is stored in said memory as a log, transferring said given information stored in memory to a disk device and storing said given information in said disk device.

20. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, receiving the result of the execution, and passing said result to said program;

storing given information when calling said function for performing said predetermined process and given information when receiving said result of the execution as a log in memory;

specifying the size of information stored in said memory; and after said given information associated with said specified size is stored in said memory as a log, transferring said given information stored in memory to a disk device and storing said given information in said disk device.

21. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, receiving the result of the execution, and passing said result to said program;

storing given information when calling said function for performing said predetermined process and given information when receiving said result of the execution as a log in memory;

determining whether or not a parameter or a return value is defined as a memory address in a function definition in said program, and if a parameter or a return value is defined as a memory address, reading the size of said parameter or return value defined in said function definition in said program; and recording binary data at said memory address as a log, the size of said binary data being equal to said read size.

22. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, receiving the result of the execution, and passing said result to said program;

determining whether or not a parameter or a return value is defined as a memory address in a function definition in said program, and if a parameter or a return value is defined as a memory address, reading the size of said parameter or return value defined in said function definition in said program; and recording binary data at said memory address as a log in memory, the size of said binary data being equal to said read size;

specifying the size of a portion of said binary data stored in said memory, said portion being to be transferred to a disk device; and comparing said read size with said specified size and transferring an amount of the binary data from said memory to the disk device and storing the binary data in said disk device, said amount being equivalent to the not larger one of said sizes.

23. A computer-implemented log acquisition method for obtaining a runtime log of a program including a method for performing a predetermined process, comprising the step of:

changing the address of said method loaded for performing said predetermined process to the address of a method for log acquisition, wherein said method for log acquisition comprises the steps of:

calling said method for performing said predetermined process to cause said process to be executed, receiving the result of the execution, and passing said result to said program;

determining whether or not a parameter or return value is defined as a structure in a function definition in said program;

if a parameter or return value is defined as a structure, placing the content of said structure in memory on the basis of a packing option of said structure; and recording the content of said structure placed in said memory as a log in a disk device.

24. A computer-implemented log acquisition method for acquiring a runtime log of a program including a method for performing a predetermined process, comprising the step of:

changing the address of said method loaded for performing said predetermined process to the address of a method for log acquisition, wherein said method for log acquisition comprises the steps of:

calling said method for performing said predetermined process to cause said predetermined process to be executed, receiving the result of the execution, and passing said result to said program;

storing given information when calling said method for performing said predetermined process and given information when receiving said result of the execution as a log in memory;

specifying the number of calls to the method for performing said predetermined process; and after said given information associated with said specified number of calls is stored in said memory as a log, transferring said given information stored in memory to a disk device and storing said given information in said disk device.

25. A computer-implemented log acquisition method for acquiring a runtime log of a program including a method for performing a predetermined process, comprising the step of:

changing the address of said method loaded for performing said predetermined process to the address of a method for log acquisition, wherein said method for log acquisition comprises the steps of:

calling said method for performing said predetermined process to cause said predetermined process to be executed, receiving the result of the execution, and passing said result to said program;

storing given information when calling said method for performing said predetermined process and given information when receiving said result of the execution as a log in memory;

specifying the size of information stored in said memory; and after said given information associated with said specified number of calls is stored in said memory as a log, transferring said given information stored in memory to a disk device and storing said given information in said disk device.

26. A computer-implemented log acquisition method for acquiring a runtime log of a program including a method for performing a predetermined process, comprising the step of:

changing the address of said method loaded for performing said predetermined process to the address of a method for log acquisition, wherein said method for log acquisition comprises the steps of:

calling said method for performing said predetermined process to cause said predetermined process to be executed, receiving the result of the execution, and passing said result to said program;

storing given information when calling said method for performing said predetermined process and given information when receiving said result of the execution as a log in memory;

determining whether or not a parameter or a return value is defined as a memory address in a function definition in said program, and if a parameter or a return value is defined as a memory address, reading the size of said parameter or return value defined in said function definition in said program; and recording binary data at said memory address as a log, the size of said binary data being equal to said read size.

27. A computer-implemented log acquisition method for acquiring a runtime log of a program including a method for performing a predetermined process, comprising the step of:

changing the address of said method loaded for performing said predetermined process to the address of a method for log acquisition, wherein said method for log acquisition comprises the steps of:

calling said method for performing said predetermined process to cause said predetermined process to be executed, receiving the result of the execution, and passing said result to said program;

determining whether or not a parameter or a return value is defined as a memory address in a function definition in said program, and if a parameter or a return value is defined as a memory address, reading the size of said parameter or return value defined in said function definition in said program; and recording binary data at said memory address as a log in memory, the size of said binary data being equal to said read size;

specifying the size of a portion of said binary data stored in said memory, said portion being to be transferred to a disk device; and comparing said read size with said specified size and transferring an amount of the binary data from said memory to the disk device and storing the binary data in said disk device, said amount being equivalent to the not larger one of said sizes.

* * * * *

UNITED STATES PATENT AND TRADEMARK OFFICE
CERTIFICATE OF CORRECTION

PATENT NO. : 7,188,279 B2  Page 1 of 3
APPLICATION NO. : 10/465280
DATED : March 6, 2007
INVENTOR(S) : Toshiaki Iizuka It is certified that error appears in the above-identified patent and that said Letters Patent is hereby corrected as shown below:

SHEET 14:

Figure 12, "Method BB Code" should read --Method BC Code--.

SHEET 40:

Figure 38, "FORM" should read --FROM--.

SHEET 42:

Figure 40, "NOT" should read --DO NOT--.

COLUMN 1:

Line 60, "acquisition;" should read --acquisition,--.

COLUMN 5:

Line 3, "C.LL" should read --C.DLL--;
    Line 40, "issues" should read --issue--;
    Line 43, "interface." should read --interfaces.--; and
    Line 49, "part" should read --part of--.

COLUMN 6:

Line 21, "write" should read --writes--.

COLUMN 7:

Line 22, "not" should read --no--; and
    Line 40, "(241-245)" should read --(241-245) are--.

COLUMN 8:

Line 31, "embodiment" should read --embodiment,--;
    Line 32, "has," should read --has--; and
    Line 52, "(step S11702)." should read --step S1702).--.

COLUMN 9:

Line 7, "(step S11708)." should read --(step S1708).--.

UNITED STATES PATENT AND TRADEMARK OFFICE
CERTIFICATE OF CORRECTION

PATENT NO. : 7,188,279 B2
APPLICATION NO. : 10/465280
DATED : March 6, 2007
INVENTOR(S) : Toshiaki Iizuka It is certified that error appears in the above-identified patent and that said Letters Patent is hereby corrected as shown below:

COLUMN 11:

Line 8, ".fwdarw.0x000000," should read --→0x00000000,--;
    Line 10, ".fwdarw.0x000000," should read --→0x00000000,--;
    Line 12, ".fwdarw.0x000000," should read --→0x00000000,--;
    Line 14, ".fwdarw.0x000000," should read --→0x00000000,--;
    Line 15, "0x0000000," should read --0x00000010,--;
    Line 33, ".fwdarw.0x000000," should read --→0x00000000,--;
    Line 35, ".fwdarw.0x000000," should read --→0x00000000,--;
    Line 37, ".fwdarw.0x000000," should read --→0x00000000,--;
    Line 39, ".fwdarw.0x000000," should read --→0x00000000,--;
    Line 48, ".fwdarw.0x000000," should read --→0x00000000,--;
    Line 50, ".fwdarw.0x000000," should read --→0x00000000,--;
    Line 52, ".fwdarw.0x000000," should read --→0x00000000,--;
    Line 54, ".fwdarw.0x000000," should read --→0x00000000,--;
    Line 58, "structure-packing" should read --structure packing--;
    Line 61, ".fwdarw.0x000000," should read --→0x00000000,--;
    Line 63, ".fwdarw.0x000000," should read --→0x00000000,--; and
    Line 65, ".fwdarw.0x000000," should read --→0x00000000,--.

COLUMN 12:

Line 1, ".fwdarw.0x000000," should read --→0x00000000,--; and
    Line 34, "name," (second occurrence) should read --name, and--.

COLUMN 13:

Line 4, "of" should read --of a--;
    Line 26, "(step S3103)" should read --(step S3103).--;
    Line 35, "(step S3109)" should read --(step S3109).--; and
    Line 66, "kept" should read --keep--.

COLUMN 14:

Line 6, "in" should read --in a--;
    Line 18, "of" should read --of a--; and
    Line 24, delete "whether".

UNITED STATES PATENT AND TRADEMARK OFFICE
CERTIFICATE OF CORRECTION

PATENT NO. : 7,188,279 B2
APPLICATION NO. : 10/465280
DATED : March 6, 2007
INVENTOR(S) : Toshiaki Iizuka It is certified that error appears in the above-identified patent and that said Letters Patent is hereby corrected as shown below:

COLUMN 16:

Line 22, "machine." should read --machine).--;
Line 49, "a" (first occurrence) should read --an--; and
Line 56, "need" should read --needed--.

Signed and Sealed this

Fourth Day of March, 2008

JON W. DUDAS
*Director of the United States Patent and Trademark Office*